(12) United States Patent
Kwon et al.

(10) Patent No.: US 12,770,940 B2
(45) Date of Patent: Oct. 20, 2026

US012770940B2

(54) X-RAY IMAGING APPARATUS AND METHOD FOR INSPECTING DEFECTS OF CYLINDRICAL BATTERY

(71) Applicant: Gaia Vison Inc., Suwon (KR)

(72) Inventors: TaeJune Kwon, Seoul (KR); Keunho Rew, Suwon (KR)

(73) Assignee: Gaia Vision Inc., Suwon (KR)

( * ) Notice: Subject to any disclaimer, the term of this patent is extended or adjusted under 35 U.S.C. 154(b) by 96 days.

(21) Appl. No.: 18/991,307

(22) Filed: Dec. 20, 2024

(65) Prior Publication Data

US 2026/0098820 A1 Apr. 9, 2026

(30) Foreign Application Priority Data

Oct. 7, 2024 (KR) ........................ 10-2024-0135646
Nov. 21, 2024 (KR) ........................ 10-2024-0167494

(51) Int. Cl.

| | |
|---|---|
| ***H01M 10/42*** | (2006.01) |
| ***G06T 7/00*** | (2017.01) |
| ***G06T 7/13*** | (2017.01) |
| ***G06T 7/136*** | (2017.01) |

(52) U.S. Cl.
CPC ....... *H01M 10/4285* (2013.01); *G06T 7/0006* (2013.01); *G06T 7/13* (2017.01); *G06T 7/136* (2017.01); *H01M 10/4207* (2013.01); *G06T 2207/10081* (2013.01); *G06T 2207/30164* (2013.01); *Y02E 60/10* (2013.01)

(58) Field of Classification Search
None
See application file for complete search history.

(56) References Cited

U.S. PATENT DOCUMENTS

2026/0098820 A1* 4/2026 Kwon ............... H01M 10/4285

FOREIGN PATENT DOCUMENTS

| | | | | |
|---|---|---|---|---|
| CN | 118443695 A * | 8/2024 | ............. | B65G 47/74 |
| KR | 100978054 B1 * | 8/2010 | ............ | H01M 10/48 |
| KR | 101962712 B1 * | 3/2019 | ........... | G01N 23/083 |
| KR | 101975559 B1 * | 5/2019 | ........... | G01N 23/083 |

(Continued)

OTHER PUBLICATIONS

Cai et al., "Battery Internal Short Detection Methodology Using Cell Swelling Measurements," 2020 American Control Conference, Denvor, CO, USA, Jul. 1-3, 2020.

(Continued)

*Primary Examiner* — Thomas R Artman
(74) *Attorney, Agent, or Firm* — United One Law Group LLC; Kongsik Kim; Jhongwoo Peck

(57) ABSTRACT

A battery defect inspection system includes a support device for supporting a plurality of cylindrical batteries; a first transfer unit configured to transfer the cylindrical batteries to the support device; a second transfer unit configured to discharge the cylindrical batteries from the support device; a first rail along which the first and second transfer units are guided; a second rail extending parallel to the first rail, along which a receiving container accommodating the plurality of cylindrical batteries is guided and transferred; an X-ray generating unit configured to irradiate X-rays toward the plurality of cylindrical batteries supported by the support device; and an X-ray detector disposed opposite the X-ray generating unit.

9 Claims, 29 Drawing Sheets

(56) References Cited

FOREIGN PATENT DOCUMENTS

| | | | | | |
|---|---|---|---|---|---|
| KR | 20220052058 | A | * | 4/2022 | G01N 21/952 |
| KR | 20230105927 | A | * | 7/2023 | G01N 23/046 |
| KR | 20240032534 | A | * | 3/2024 | H02J 7/70 |
| KR | 102653313 | B1 | * | 4/2024 | G01N 23/046 |
| KR | 20240099783 | A | * | 7/2024 | H01M 10/0422 |
| KR | 20240153261 | A | * | 10/2024 | H01M 10/4285 |

OTHER PUBLICATIONS

Naha et al., “Internal short circuit detection in Li-ion batteries using supervised machine learning,” Scientific Reports, 10:1301, 2020.

* cited by examiner (a) (b)

X-RAY IMAGING APPARATUS AND METHOD FOR INSPECTING DEFECTS OF CYLINDRICAL BATTERY

CROSS-REFERENCE TO RELATED APPLICATIONS

This application claims priorities from Korean Patent Application No. 10-2024-0135646 filed on Oct. 7, 2024 and Korean Patent Application No. 10-2024-0167494 filed on Nov. 21, 2024. The aforementioned applications are incorporated herein by reference in their entireties.

TECHNICAL FIELD

The present disclosure relates to an inspection system for a cylindrical battery and a method for detecting internal defects of a cylindrical battery using the inspection system.

RELATED ART

Cylindrical lithium-ion batteries have risks such as explosions, fires, and electrolyte leakage. They have a high risk of exploding due to factors like short circuits or external impacts. Furthermore, when fires occur in batteries used in electric vehicles, attempting to extinguish them with water can also lead to explosions.

Therefore, inspecting these cylindrical batteries for internal defects and preventing defective ones from being shipped is crucial for safety.

Computed tomography (CT) can be a powerful tool for non-destructive internal inspection of batteries. However, manual analysis of CT scan images to find defects has limitations in that it is time-consuming and prone to human error.

SUMMARY

The object of the present disclosure is to provide a defect inspection system that performs X-ray imaging to generate CT images for inspecting internal defects in cylindrical batteries, a cylindrical battery support device used in such a system, a battery defect inspection method using the aforementioned inspection system.

Furthermore, this invention aims to distinguish between normal and defective batteries by analyzing CT scan images of the batteries and identifying potential deformations and enhance the efficiency and accuracy of battery quality control by automating the defect detection process.

The present disclosure provides a battery defect inspection system which comprises a support device for supporting a plurality of cylindrical batteries; a first transfer unit configured to transfer the cylindrical batteries to the support device; a second transfer unit configured to discharge the cylindrical batteries from the support device; a first rail along which the first and second transfer units are guided; a second rail extending parallel to the first rail, along which a receiving container accommodating the plurality of cylindrical batteries is guided and transferred; an X-ray generating unit configured to irradiate X-rays toward the plurality of cylindrical batteries supported by the support device; and an X-ray detector disposed opposite the X-ray generating unit.

The support device includes a plurality of rotating support rods that rotate at predetermined angular intervals by a rotation driving unit, and a plurality of opposing support rods provided in a direction facing the rotating support rods. The X-ray generating unit and the X-ray detector are configured to capture X-ray images of the plurality of cylindrical batteries at the predetermined angular intervals. The first and second transfer units include grippers that are movable up and down and grip the cylindrical batteries. The plurality of cylindrical batteries are supported between the rotating support rods and the opposing support rods such that the upper and lower sides of the cylindrical batteries are exposed.

The battery defect inspection system of the present disclosure can further comprise a first movable support plate that supports the plurality of rotating support rods and is movable toward and away from the cylindrical battery; and a second movable support plate that supports the plurality of opposing support rods and is movable toward and away from the cylindrical battery.

The first movable support plate and the second movable support plate can be configured to move away from the cylindrical battery when the cylindrical battery is supplied or discharged; and move toward the cylindrical battery to bring the cylindrical battery into contact with the rotating support rods and the opposing support rods when performing X-ray imaging for defect inspection of the cylindrical battery.

A groove can be formed in the circumferential direction of at least one of the rotating support rod and the opposing support rod. An elastomer can be disposed in the groove and a side surface of the cylindrical battery is configured to contact the elastomer.

The gripper can comprise a gripping drive unit; and a pair of gripping elements that are configured to move toward and away from each other by the gripping drive unit.

The battery defect inspection system of the present disclosure can further comprise a housing. In this embodiment, the first transfer unit, the second transfer unit, the first rail, the second rail, the X-ray generating unit, and the X-ray detector can be disposed inside the housing. The housing can include a first shutter provided on the upstream side of the second rail and configured to be openable and closable, and a second shutter provided on the downstream side of the second rail and configured to be openable and closable.

The support device can further comprise a driving force transmission unit for transmitting a driving force of the rotation driving unit to the rotating support rods, and an idler. The driving force transmission unit can be a timing belt. The rotating support rods can include a timing pulley associated with the timing belt. The idler can be provided to press the timing belt toward the rotation driving unit.

The support device can further comprise an adjustment screw connected to the second movable support plate; a bracket that supports the second movable support plate and is threadedly coupled to the adjustment screw. The second movable support plate can be configured to move toward and away from the cylindrical battery by rotation of the adjustment screw.

A method for performing X-ray imaging on a plurality of cylindrical batteries of the present disclosure, which uses the battery defect inspection system comprises a first step of lowering a gripper of the first transfer unit toward a receiving container accommodating the plurality of cylindrical batteries, gripping the plurality of cylindrical batteries with a pair of gripping elements, and raising the gripper; a second step of moving the first transfer unit along the first rail so that the plurality of cylindrical batteries gripped by the first transfer unit are disposed between a plurality of rotating support rods and a plurality of opposing support rods; a third step of moving the first support plate and the second support plate toward each other to bring the plurality of cylindrical batteries into contact with the plurality of rotating support rods and the plurality of opposing support rods; a fourth step of performing X-ray imaging on the plurality of cylindrical batteries while a rotation driving unit rotates the plurality of rotating support rods at predetermined angular intervals; a fifth step of transferring the receiving container to a discharge waiting position along the second rail; a sixth step of moving the first support plate and the second support plate away from each other; a seventh step of moving a second transfer unit toward the plurality of cylindrical batteries, gripping the plurality of cylindrical batteries with a gripper of the second transfer unit, and moving the second transfer unit toward a receiving container disposed at the discharge waiting position; an eighth step of lowering the gripper of the second transfer unit, placing the plurality of cylindrical batteries into the receiving container disposed at the discharge waiting position, and raising the gripper; and a ninth step of supplying a new receiving container accommodating the plurality of cylindrical batteries to a supply position.

A method for determining an internal defect of a cylindrical secondary battery of the present disclosure comprises a first step of recognizing a circle in the CT cross-sectional image; a second step of performing boundary point recognition processing on a jelly roll line of the CT cross-sectional image; a third step of calculating a normal vector at the boundary point recognized in the second step; a fourth step of calculating a vector directed from the boundary point toward the center of the circle recognized in the tenth step; a fifth step of calculating an angle between the normal vector calculated in the twelfth step and the vector calculated in the thirteenth step for the boundary point; a sixth step of calculating a curvature at the boundary point; and a seventh step of determining presence of a defect based on the angle calculated in the fourteenth step and the curvature calculated in the fifteenth step.

The method for determining an internal defect of a cylindrical secondary battery according to the present disclosure can further comprises an eighth step of performing grayscale conversion on the CT cross-sectional image; a ninth step of binarizing the grayscale image converted at the eighth step into black and white pixels; and a tenth step of performing skeletonization on the black and white image binarized at the ninth step. The eight step to the tenth step are carried out before the first step.

The seventh step can be a step of determining a defect according to a criteria of whether a first condition that the angle is greater than or equal to a first predetermined value and a second condition that the curvature is greater than or equal to a second predetermined value are satisfied.

According to the present disclosure, it is possible to acquire CT images through X-ray imaging of multiple cylindrical batteries at once. By segmenting and processing these CT images, internal defects of the cylindrical batteries can be detected very quickly. Moreover, since a system capable of continuously inspecting internal defects in multiple units is provided, the inspection speed can be increased.

Furthermore, the present disclosure enables rapid and effective detection of internal defects in cylindrical secondary batteries through CT image analysis, thereby providing the effect of preventing the risk of explosion and fire in advance.

Figure 1:
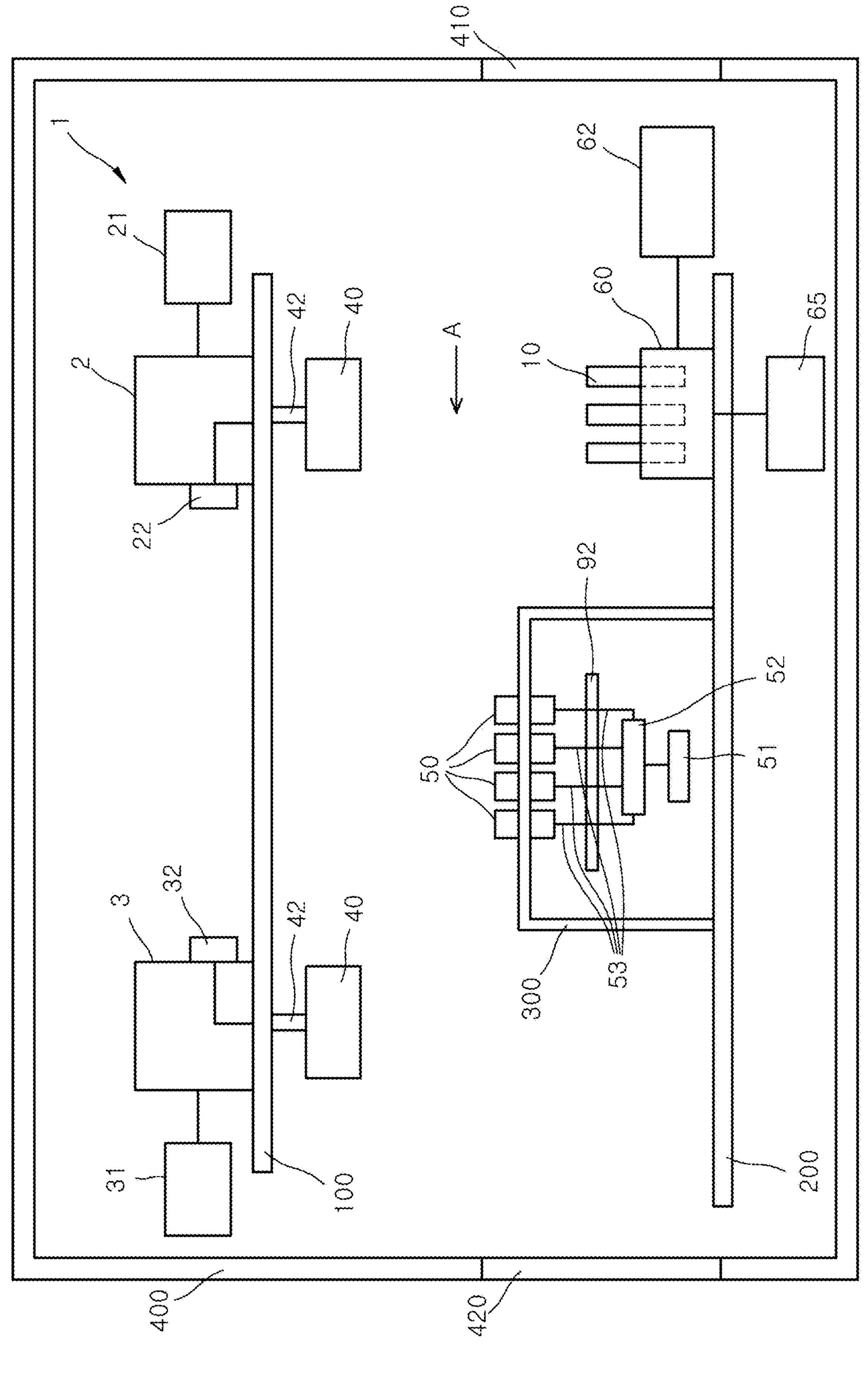
FIG. 1 is a conceptual side view of an inspection system for a cylindrical battery according to the present disclosure.

It should be understood that the above-referenced drawings are not necessarily to scale, presenting a somewhat simplified representation of various preferred features illustrative of the basic principles of the disclosure. The specific design features of the present disclosure will be determined in part by the particular intended application and use environment.

DETAILED DESCRIPTION

Hereinafter, the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

In addition, in this specification, “A or B” is defined not only as selectively referring to either A or B, but also as including both A and B. In addition, in this specification, the term “comprise” has a meaning of further including other components in addition to the components listed.

The terminology used herein is for the purpose of describing particular embodiments only and is not intended to be limiting of the disclosure. As used herein, the singular forms “a,” “an,” and “the” are intended to include the plural forms as well, unless the context clearly indicates otherwise. It will be further understood that the terms “comprise” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

The terms "first," "second," or the like are herein used to distinguishably refer to same or similar elements, or the steps of the present disclosure and they may not infer an order or a plurality.

In this specification, the essential elements for the present disclosure will be described and the non-essential elements may not be described. However, the scope of the present disclosure should not be limited to the invention including only the described components. Further, it should be understood that the invention which includes additional element or does not have non-essential elements can be within the scope of the present disclosure.

The method for determining an internal defect of a cylindrical secondary battery according to the present disclosure can be carried out by an electronic arithmetic device.

The electronic arithmetic device can be a device such as a computer, tablet, mobile phone, portable computing device, stationary computing device, server computer etc. Additionally, it is understood that one or more various methods, or aspects thereof, may be executed by at least one processor. The processor may be implemented on a computer, tablet, mobile device, portable computing device, etc. A memory configured to store program instructions may also be implemented in the device(s), in which case the processor is specifically programmed to execute the stored program instructions to perform one or more processes, which are described further below. Moreover, it is understood that the below information, methods, etc. may be executed by a computer, tablet, mobile device, portable computing device, etc. including the processor, in conjunction with one or more additional components, as described in detail below. Furthermore, control logic may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

In this specification, "upstream" and "downstream" are defined based on the direction of battery movement during supply and discharge for inspection.

FIG. 1 shows a conceptual side view of an inspection system for a defect of a cylindrical battery according to the present disclosure. Although not shown in the drawing, an X-ray imaging device is disposed on one side of the battery support device and an X-ray detector is disposed on the opposite side, as viewed from direction A in FIG. 1. X-ray imaging is performed while the cylindrical battery rotates at predetermined angular intervals on the battery support device. The X-ray images captured at each angle are combined to generate a CT image. By analyzing the patterns in this CT image, internal defects in the cylindrical battery can be detected through image processing.

Although the accompanying drawings illustrate an embodiment where internal defect inspection is performed in units of three cylindrical batteries, it is possible to use other number unit.

As shown in FIG. 1, the inspection system for cylindrical battery defect (1) according to the present disclosure includes a first rail (100) disposed on the upper side and a second rail (200) disposed on the lower side. The first rail (100) and the second rail (200) may be provided parallel to each other.

The inspection system for cylindrical battery defect (1) according to the present disclosure can be disposed inside a housing (400). The housing (400) may include a lead material to block radiation leakage caused by X-ray generation. The housing (400) may be provided with openable and closable first and second shutters (410, 420). The first and second shutters (410, 420) may be opened and closed by a drive unit (not shown). Alternatively, the first and/or second shutters (410, 420) may be opened and closed manually. A lead material may also be provided in the first and second shutters (410, 420) to block radiation leakage.

The first shutter (410) may be controlled to open when supplying batteries to the battery receiving container (60) and to close during inspection after the battery supply.

The second shutter (420) may be controlled to open when discharging the inspected batteries and to close when the battery discharge is completed.

According to the present disclosure, since all inspection equipment is disposed inside the housing (400) and the shutters (410, 420) are opened only when supplying or discharging batteries, the space where the inspection system is disposed can be significantly reduced compared to the inspection system of the prior art. Furthermore, the inspection time can also be significantly reduced.

For simplicity of illustration, the housing (400) is omitted from FIGS. 6 to 17.

A support device for cylindrical battery (300) according to the present disclosure is disposed between the first rail (100) and the second rail (200). Although the support device for cylindrical battery (300) is shown to be disposed on the second rail (200) in FIG. 1 for convenience of illustration, it may be disposed between the first rail (100) and the second rail (200) by a separate support frame. It can be positioned so as not to interfere with the battery receiving container (60) moving along the second rail (200), which will be described later.

The first transfer unit (2) supplies the cylindrical batteries (10) from a supply location (the location of the receiving container (60) in FIG. 1) toward the support device for cylindrical battery (300) along the first rail (100). The second transfer unit (3) transfers the batteries that have undergone X-ray imaging on the support device toward the receiving container (60) disposed at a discharge waiting location (the location of the receiving container (60) shown on the left side of FIGS. 8 to 17) along the first rail (100).

The first transfer unit (2) includes a 1-1 drive unit (21) that drives the first transfer unit (2) along the first rail (100), a gripping unit (40) that can grip and release a plurality of cylindrical batteries (10), and a 1-2 drive unit (22) that moves the gripping unit (40) up and down. The 1-2 drive unit (22) drives a shaft (42) connecting the gripping unit (40) and the first transfer unit body to extend downward or retracts upward, thereby moving the gripping unit (40) up and down.

The second transfer unit (3) includes a 2-1 drive unit (31) that drives the second transfer unit (3) along the first rail (100), a gripping unit (40) that can grip and release a plurality of cylindrical batteries (10), and a 2-2 drive unit (32) that moves the gripping unit (40) up and down. The 2-2 drive unit (32) drives a shaft (42) connecting the gripping unit (40) and the second transfer unit body to extend downward or retracts upward, thereby moving the gripping unit (40) up and down.

The battery receiving container (60) is guided along the second rail (200). The battery receiving container (60) can be supplied to the supply location (the battery receiving container location in FIG. 1) on the second rail (200) by a third drive unit (62). The battery receiving container (60) can also be transferred from the supply location to the discharge waiting location (the location of the battery receiving container on the left side of FIGS. 8 to 17) and can be transferred from the discharge waiting location to the discharge location by a fourth drive unit (65).

Figure 2:
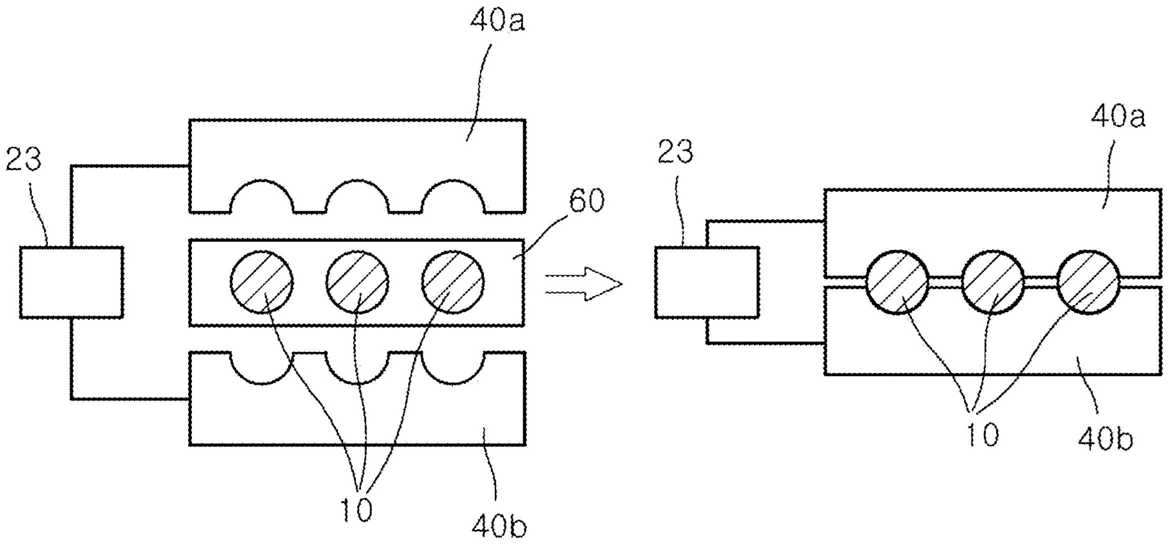
FIG. 2 is a conceptual diagram illustrating the structure of a gripping unit according to the present disclosure.

As shown in FIG. 2, the gripping unit (40) may include a gripping drive unit (23) and a pair of gripping elements (40*a*, 40*b*) that are movable relative to each other by the gripping drive unit (23). FIG. 2(*a*) shows a state where the gripping elements (40*a*, 40*b*) are aligned with the cylindrical battery (10), that is, a state where the gripping state is released, and FIG. 2(*b*) shows a state where the gripping elements (40*a*, 40*b*) grip the cylindrical battery (10).

The pair of gripping elements (40*a*, 40*b*) have a shape that cooperate with each other to grip the cylindrical battery (10) when they are brought closer to each other toward the cylindrical battery (10) by the gripping drive unit (23), as shown in FIG. 2(*b*).

The support device for cylindrical battery (300) includes a plurality of rotating support rods (50) that rotate at predetermined angular intervals by a rotation drive unit (51), a plurality of opposing support rods (70) provided in a direction facing the rotating support rods (50), a rotating shaft (53) that transmits the driving force of the rotation drive unit (51) to the rotating support rods (50), a movable support plate (92) that supports the rotating shaft (53) to be rotatable, a movable support plate (94) that supports the rotating shaft (73) of the opposing support rod (70) to be rotatable, and a driving force transmission unit (52) that transmits the driving force of the rotation drive unit (51) to the plurality of rotating support rods (50).

It is preferable that the upper and lower sides of the cylindrical battery (10) are exposed for X-ray imaging when supported between the rotating support rod (50) and the opposing support rod (70). Typically, in the case of cylindrical secondary batteries, internal defects most frequently occur on the upper and lower portions, so it is advantageous if the upper and lower portions do not contact the support rods.

The opposing support rod has its rotating shaft (73) rotatably supported by a movable support plate (94).

The opposing support rod (70) may be provided as an idler support rod or may be provided to rotate by the rotation drive unit (51) or a separate additional drive unit.

Figure 18:
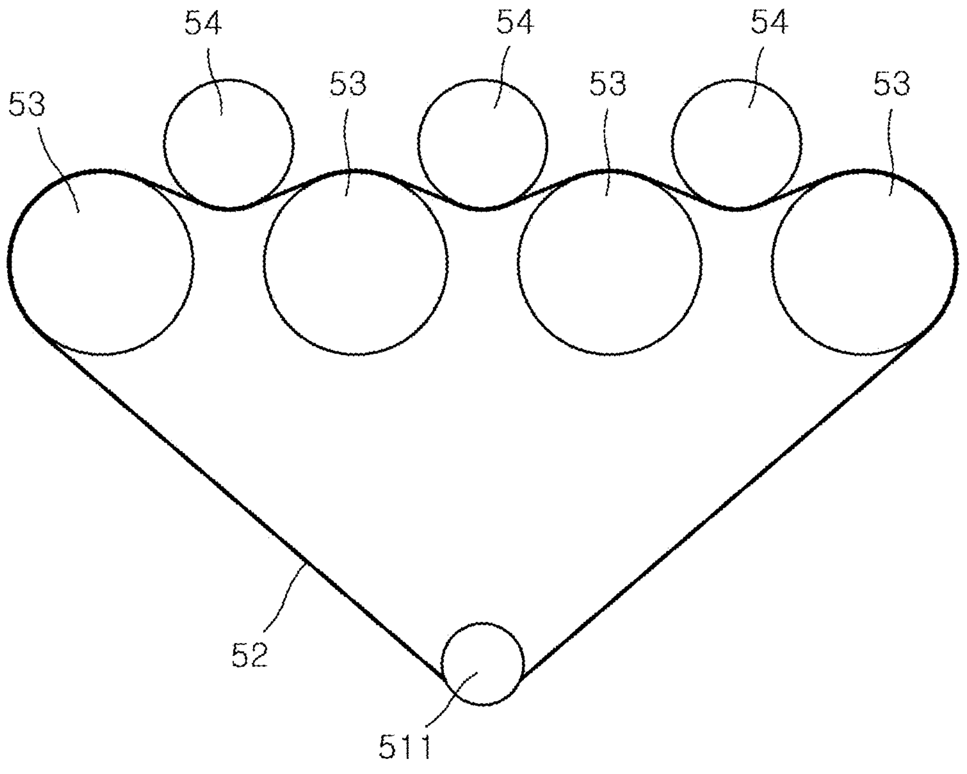
FIG. 18 is a diagram illustrating an embodiment of a drive transmission unit of the present disclosure.

FIG. 18 shows an example of the driving force transmission unit (52). A belt (52) that transmits the driving force of the drive shaft (511) of the drive unit (51) extends from the drive shaft (511) along the upper side (in FIG. 18) of the rotating shaft (53) of the rotating support rod (50) and returns to the drive shaft (511). The driving force transmission unit (52) may be a timing belt and the rotating shaft (53) may have a timing pulley.

Referring to FIG. 18, an idler (54) may be provided on the upper side of the rotating shaft (53) between adjacent rotating shafts (53) to press the belt (52) toward the rotating shaft (53). Pressing the belt (52) with the idler (54) can increase the tension of the belt (52) and facilitate power transmission with the rotating shaft (53).

Figure 3:
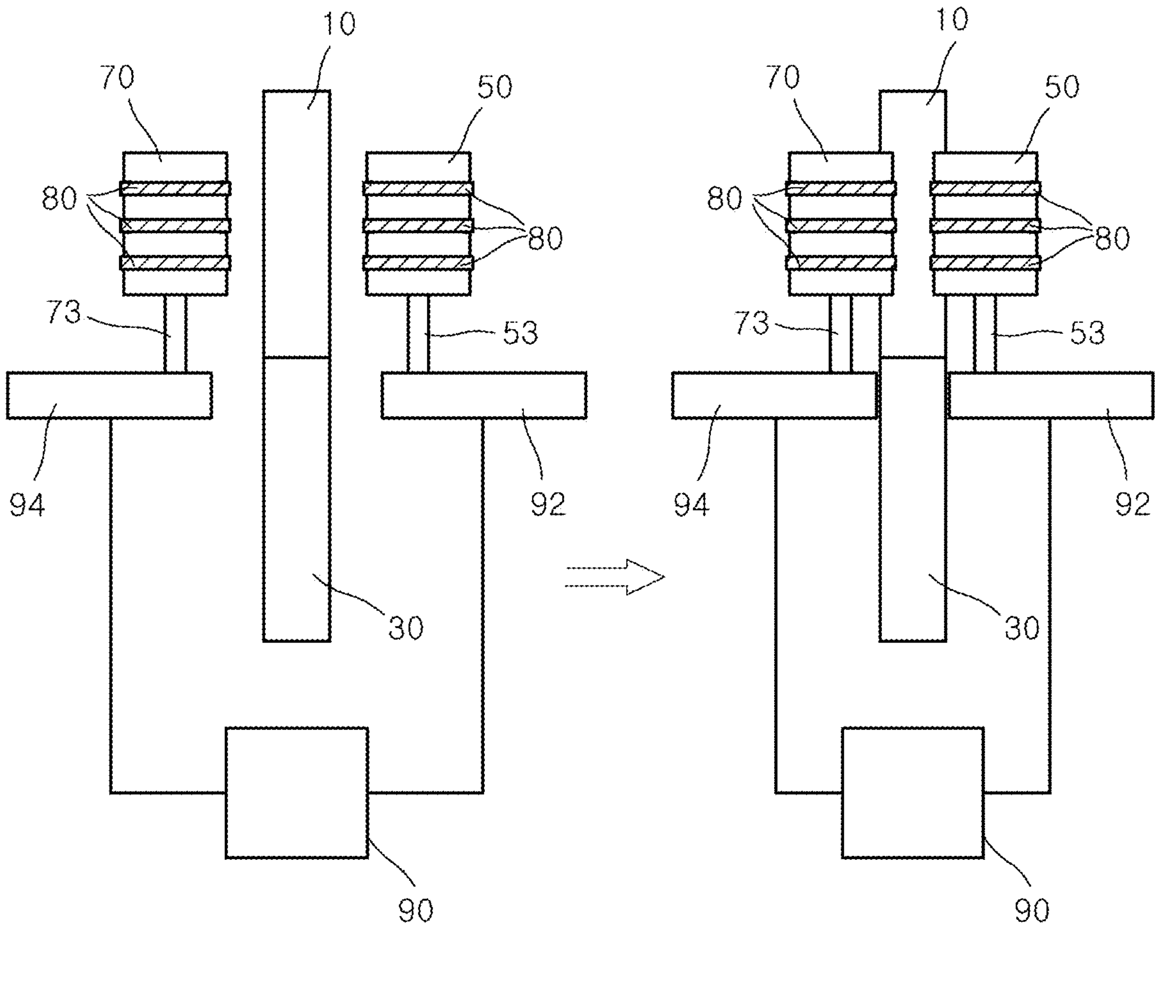
FIG. 3 is a conceptual diagram of a support device for cylindrical battery as viewed from direction A in FIG. 1.
Figure 4:
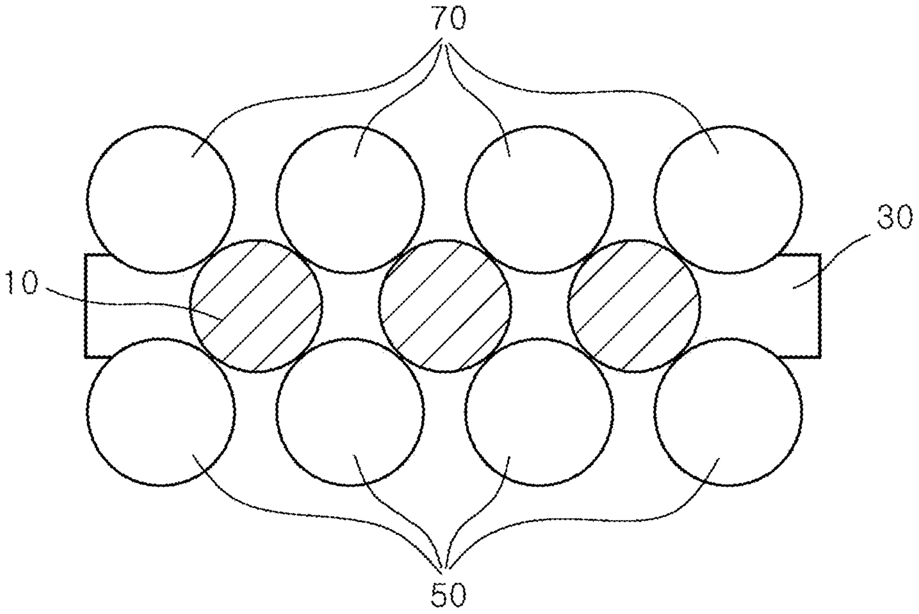
FIG. 4 is a conceptual plan view of the arrangement of a rotating support rod, an opposing support rod, and a cylindrical battery.

FIG. 3 shows a conceptual diagram of the support device for cylindrical battery as viewed from direction A in FIG. 1.

The movable support plates (92, 94) can be moved closer to or farther away from each other by a drive unit (90). A support (30) on which the cylindrical battery (10) is placed can be provided between the movable support plates (92, 94).

Figure 19:
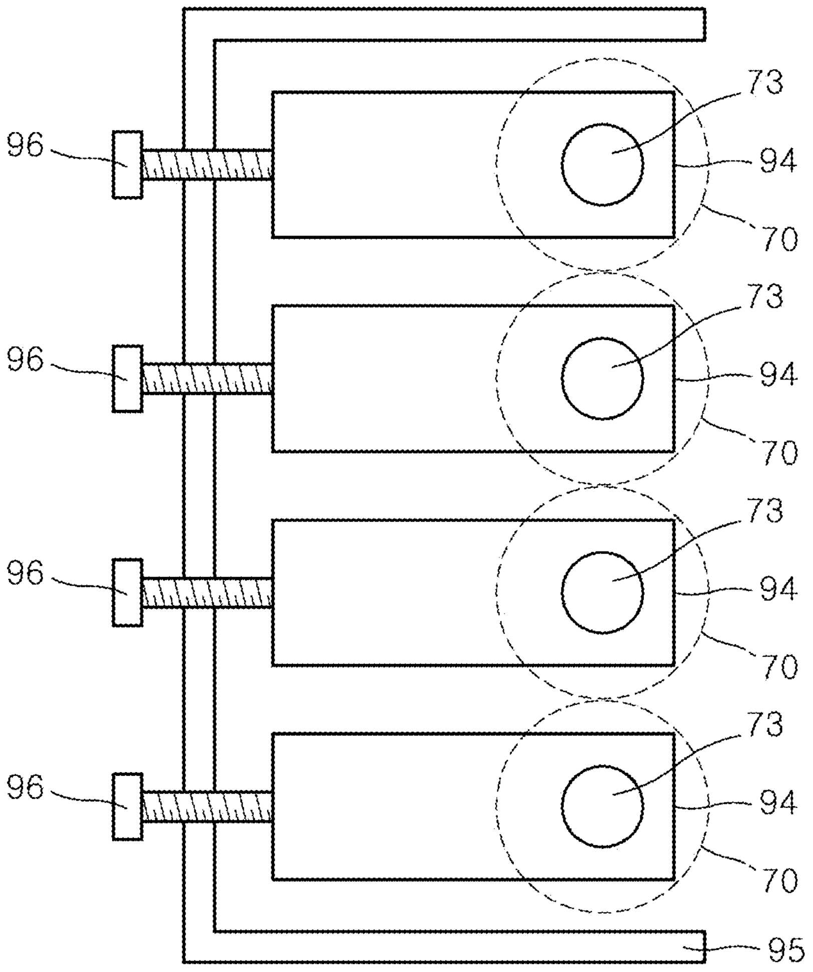
FIG. 19 is a diagram illustrating an embodiment of a movable support plate.

According to another embodiment of the present disclosure, as shown in FIG. 19, the movable support plate (94) can be driven left and right, that is, toward or away from the battery (10), by an adjustment screw (96). In the embodiment of FIG. 19, each movable support plate (94) is supported by a bracket (95) and each movable support plate (94) is connected to an adjustment screw (96). The adjustment screw (96) is threadedly coupled to pass through the bracket (95).

Rotating the adjustment screw (96) moves the adjustment screw (96) left and right along the thread of the bracket (95), thereby moving the movable support plate (94) left and right. By doing so, the force with which the opposing support rod (70) presses the battery (10) can be adjusted.

In the embodiment shown in FIG. 19, the drive unit (90; FIG. 3) can be configured to drive only the movable support plate (92).

Figure 5:
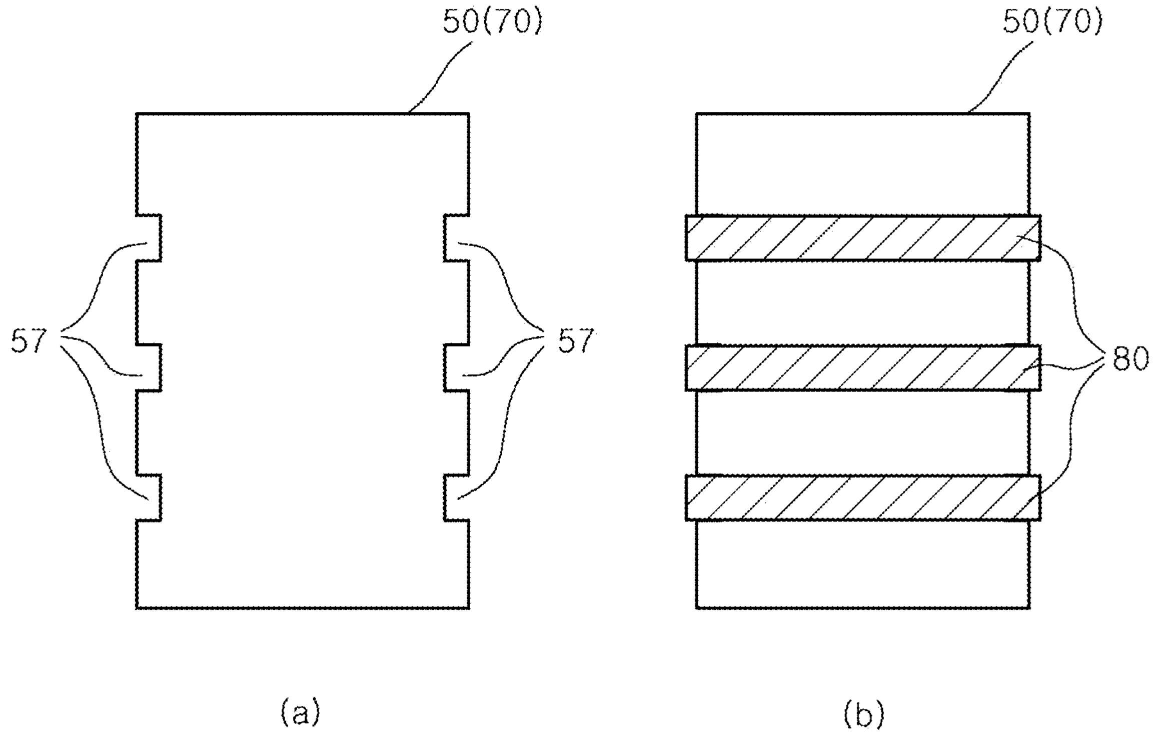
FIG. 5 is a side view of a support rod according to the present disclosure.

FIG. 5 shows an example of the rotating support rod (50) and the opposing support rod (70). The rotating support rod (50) and the opposing support rod (70) can have a cylindrical shape with a groove (57) formed along their circumference, and an elastomeric material (elastomer; 80) is disposed in the groove (57). When the cylindrical battery (10) is supported by the rotating support rod (50) and the opposing support rod (70) as shown in FIGS. 2(*b*) and 3(*b*), the side surface of the cylindrical battery (10) is in contact with the elastomeric material (80). Providing the elastomer in the groove of the rotating support rod (50) and/or the opposing support rod (70) has the effect of facilitating the rotation of the cylindrical battery (10) in contact.

According to another embodiment of the present disclosure, the rotating support rod (50) can be made of an elastomeric material, and the opposing support rod (70) can be made of a hard material.

In this specification, the term "elastomer," "elastomeric material," and the like are defined to include all elastic materials regardless of their type, such as rubber and silicone and the like.

Hereinafter, an inspection method for cylindrical battery defect according to the present disclosure will be described with reference to FIGS. 1 and 6 to 17.

A receiving container (60) containing a plurality of cylindrical batteries (10) is supplied onto the second rail (200) by a third drive unit (62), resulting in the state shown in FIG. 1.

Figure 6:
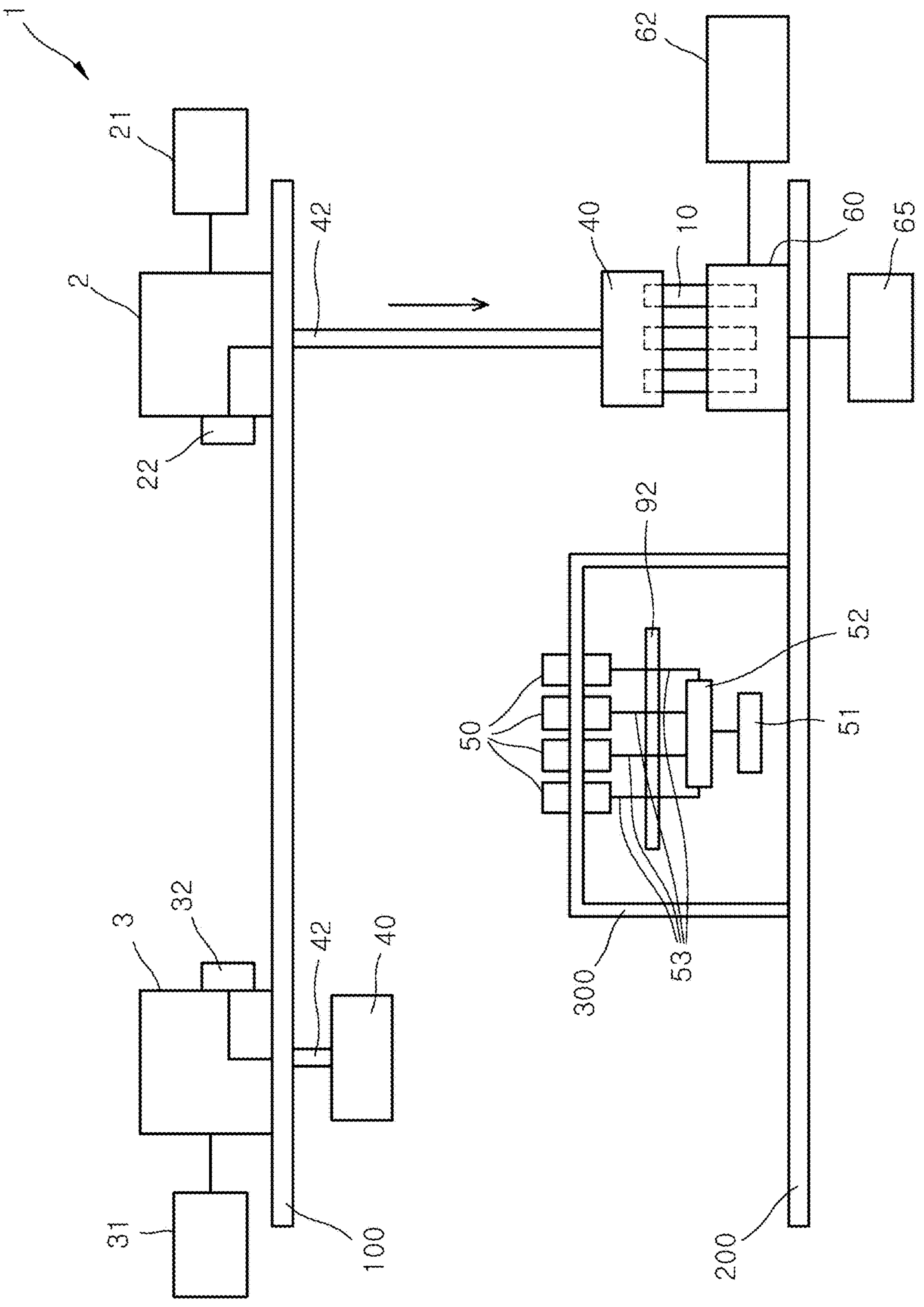
FIGS. 6 to 17 are diagrams illustrating step-by-step X-ray imaging processes for inspecting internal defects of a cylindrical battery by the inspection system for cylindrical battery according to the present disclosure.

Next, as shown in FIG. 6, the 1-1 drive unit (21) moves the first transfer unit (2) over the receiving container (60), and the 1-2 drive unit (22) drives the shaft (42) to extend downward so that the gripping unit (40) grips the plurality of cylindrical batteries (10). More specifically, when the shaft (42) extends downward, the state shown in FIG. 2(*a*) is achieved. In this state, the gripping drive unit (23) drives the gripping elements (40*a*, 40*b*) to move closer to each other, resulting in the state shown in FIG. 2(*b*). In the state of FIG. 2(*b*), the gripping elements (40*a*, 40*b*) can press and grip the cylindrical batteries.

Figure 7:
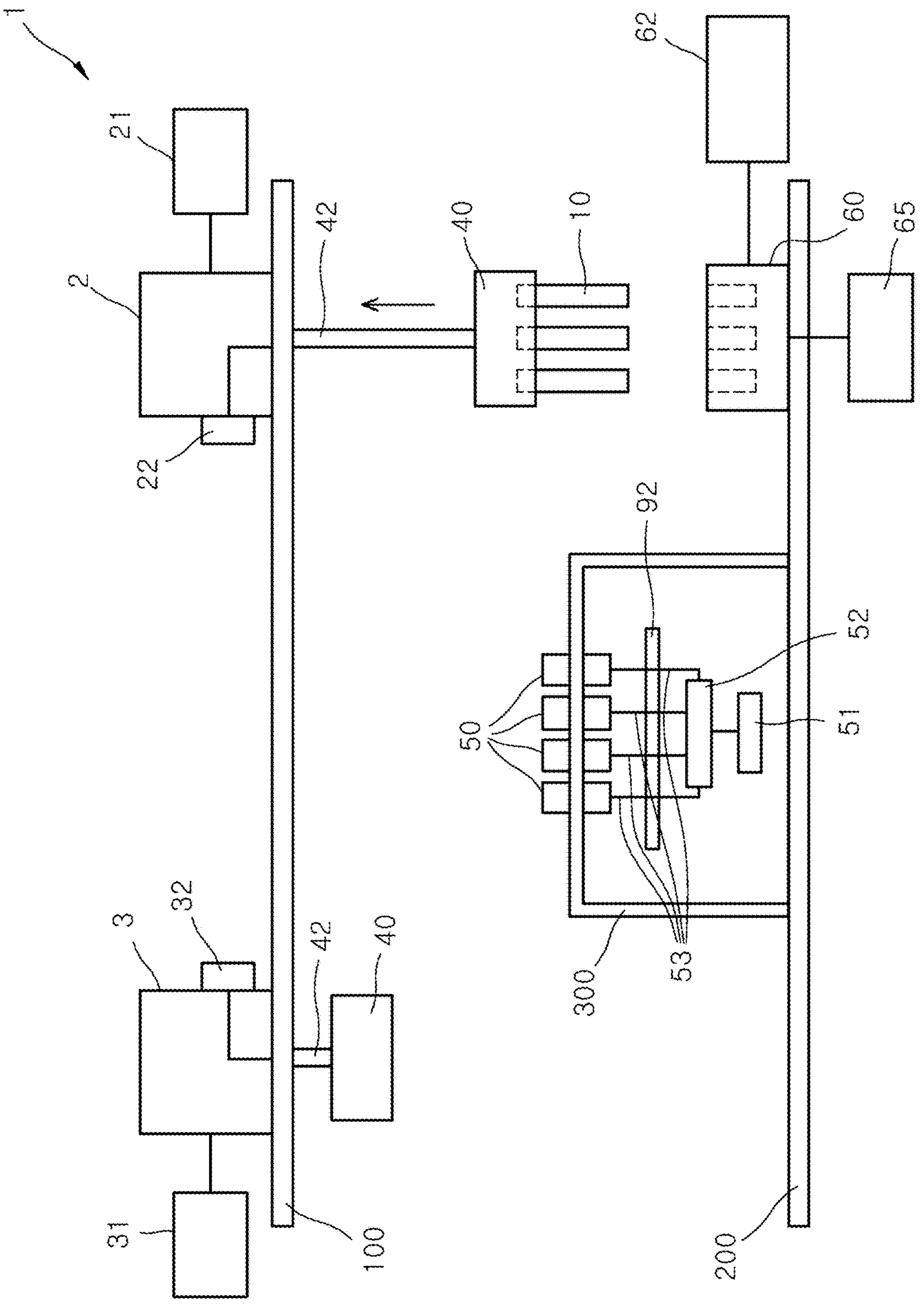

With the gripping unit (40) gripping the plurality of cylindrical batteries (10), the 1-2 drive unit (22) drives the shaft (42) to retract, lifting the cylindrical batteries (10) upward as shown in FIG. 7. The height of the cylindrical batteries (10) in FIG. 7 may be the same as the height at which they are disposed between the rotating support rod (50) and the opposing support rod (70) as shown in FIG. 3.

Figure 8:
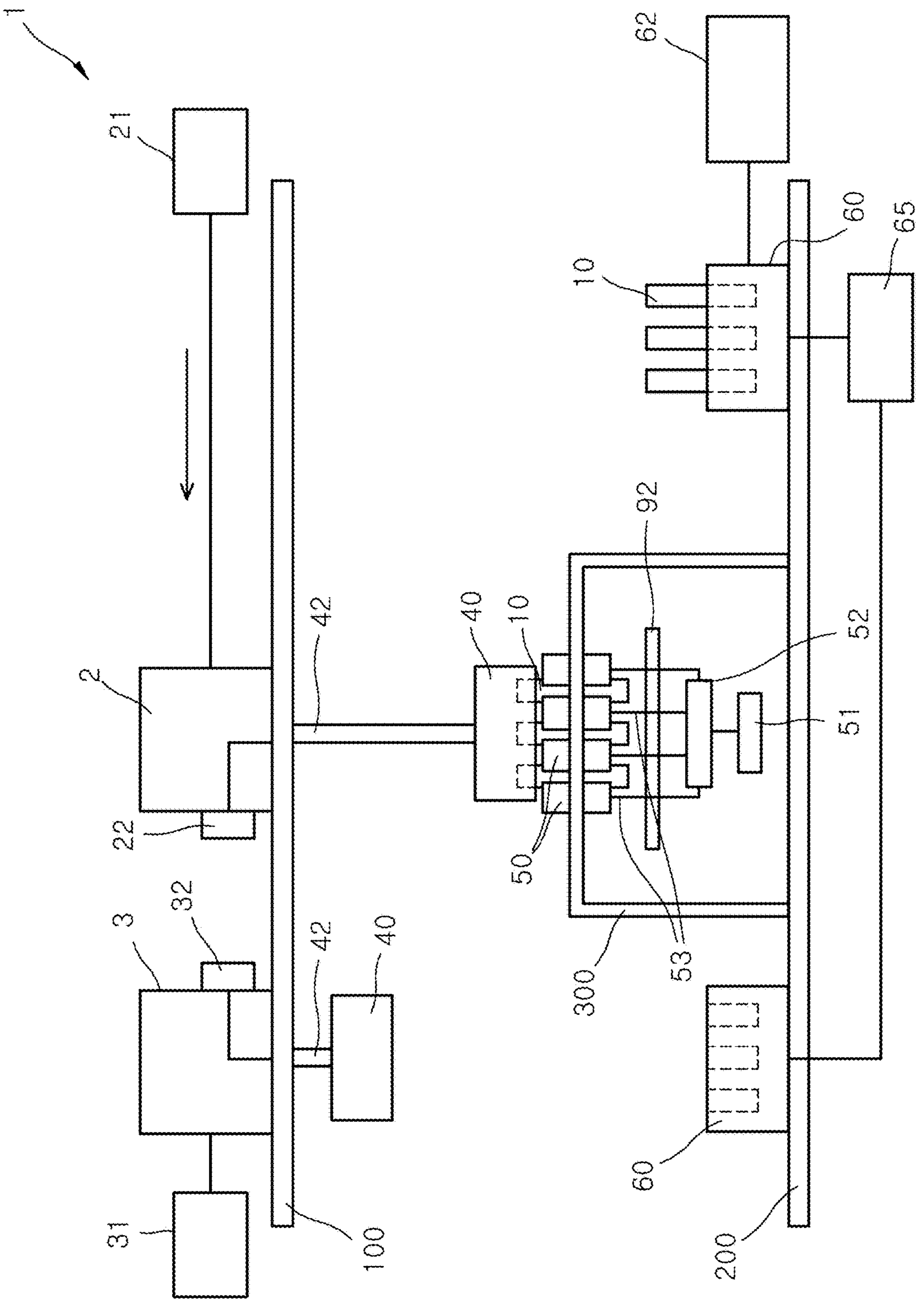

Next, as shown in FIG. 8, the 1-1 drive unit (21) moves the first transfer unit (2) toward the battery support device (300) along the first rail (100). If the height of the cylindrical batteries (10) in FIG. 7 is the same as the height in FIG. 3, the 1-1 drive unit (21) can simply move the first transfer unit (2) along the first rail (100) at the same height as in FIG. 7 without requiring the driving of the 1-2 drive unit (22).

Meanwhile, after the cylindrical batteries (10) are removed, the receiving container (60) is moved to the discharge waiting location (the left receiving container location in FIG. 8) along the second rail (200) by the driving of the fourth drive unit (65). Then, another receiving container (60; the receiving container shown on the right side of FIG. 8) containing a plurality of cylindrical batteries (10) to be inspected next is supplied to the supply location by the third drive unit (62).

Figure 9:
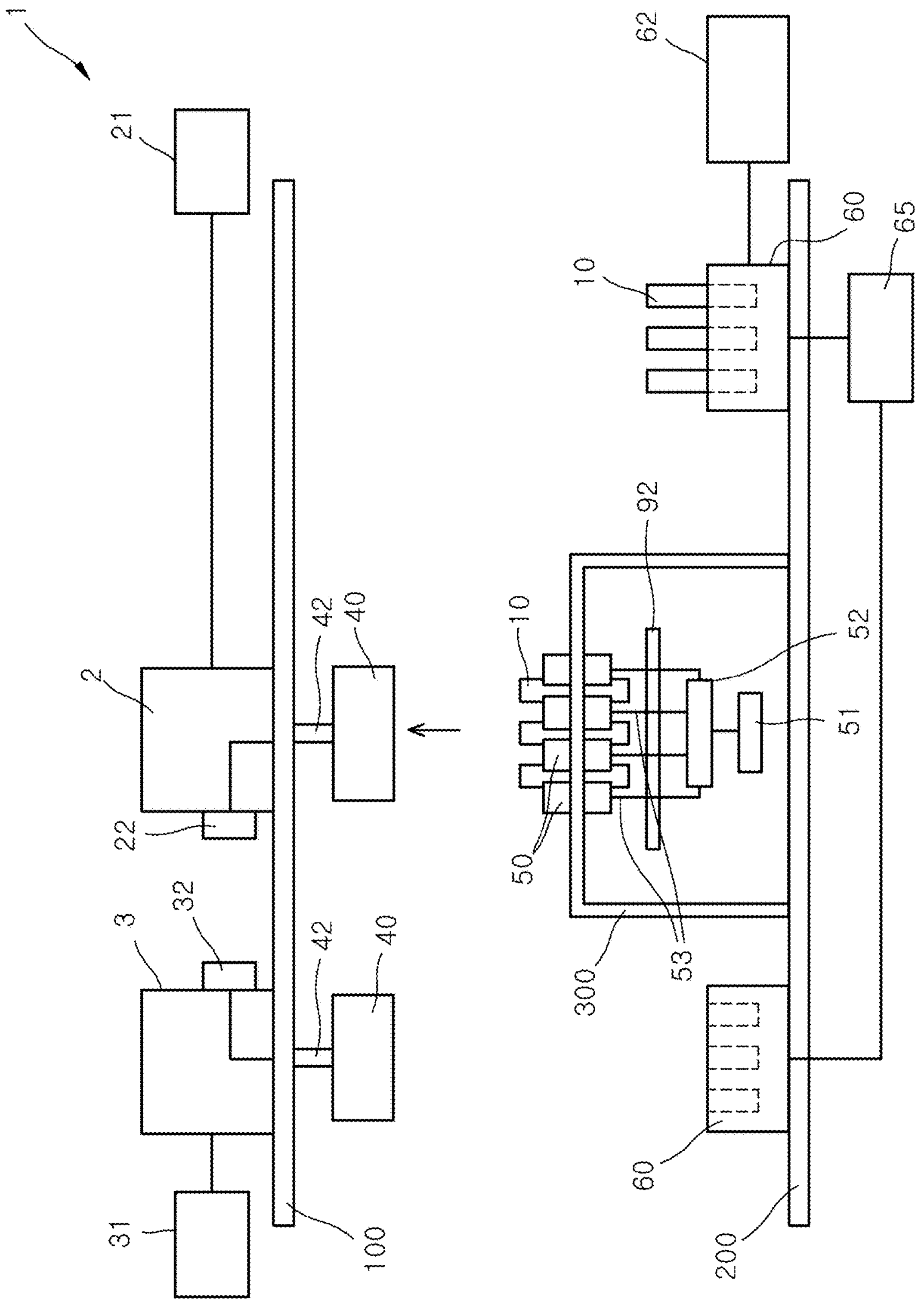

As shown in FIGS. 8 and 3(*a*), after placing the plurality of cylindrical batteries (10) to be inspected between the rotating support rod (50) and the opposing support rod (70), the 1-2 drive unit (22) retracts the shaft (42) to move the gripping unit (40) upward, as shown in FIG. 9. Then, the movable support plates (92, 94) are moved closer to each other by the drive unit (90) so that the plurality of cylindrical batteries (10) come into contact with the rotating support rod (50) and the opposing support rod (70), as shown in FIG. 3(*b*).

Figure 10:
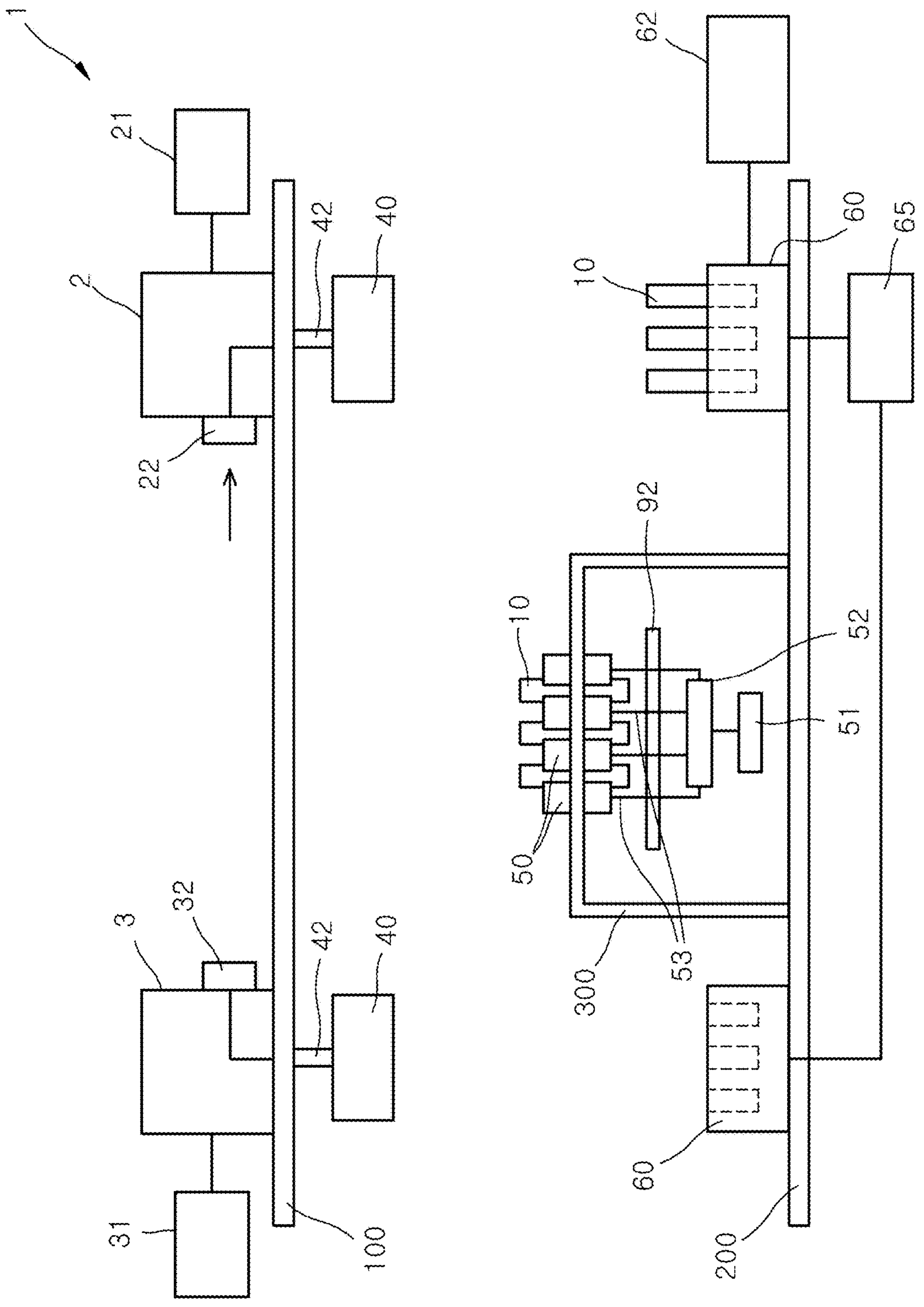
Figure 11:
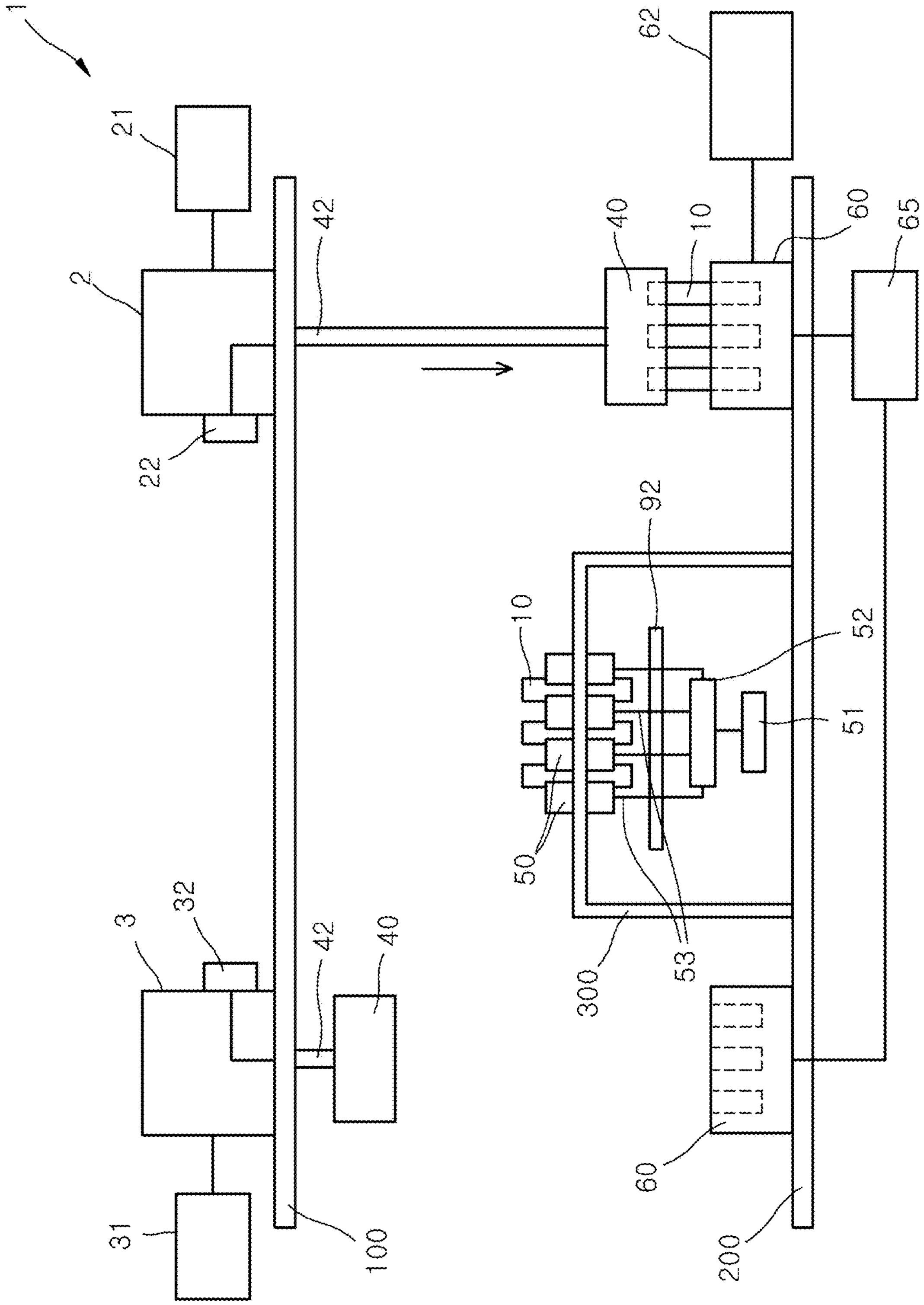

The first transfer unit (2) is returned to the position shown in FIG. 10 along the first rail (100) by the driving of the 1-1 drive unit (21). While being supported by the cylindrical battery support unit (300), the rotation drive unit (51) rotates the rotating support rod (50) at predetermined angular intervals, and accordingly, the cylindrical batteries (10) also rotate at predetermined angular intervals while X-ray imaging is performed at each angle.

When the X-ray imaging is completed, the drive unit (90) moves the movable support plates (92, 94) away from each other to return to the state shown in FIG. 3(*a*). The shaft (42) of the first transfer unit (2) is moved downward by the driving of the 1-2 drive unit (22) to grip the next plurality of cylindrical batteries (10) to be inspected.

Figure 12:
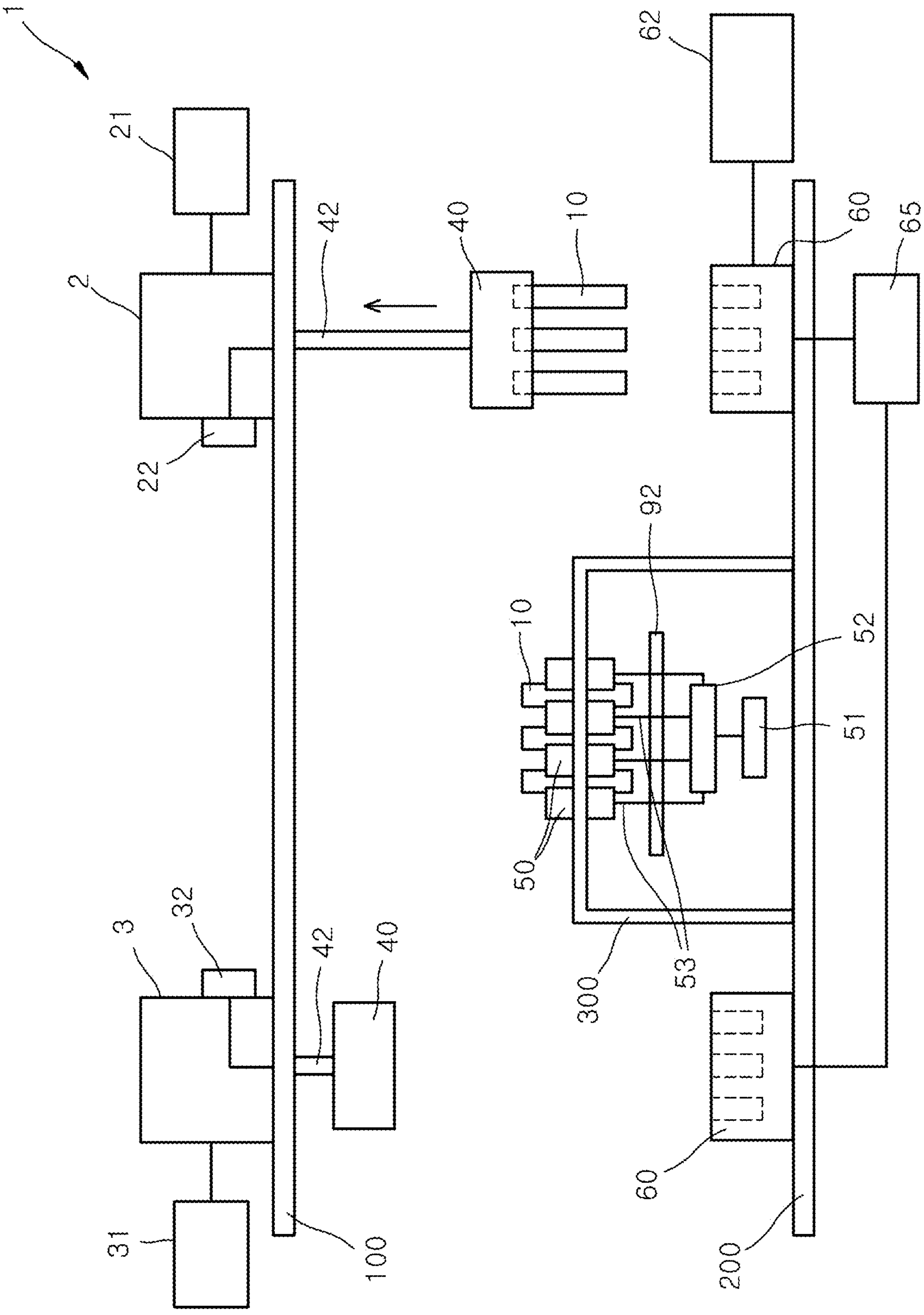

With the cylindrical batteries (10) gripped, the shaft (42) moves upward to lift the cylindrical batteries (10) to the height shown in FIG. 12.

Figure 13:
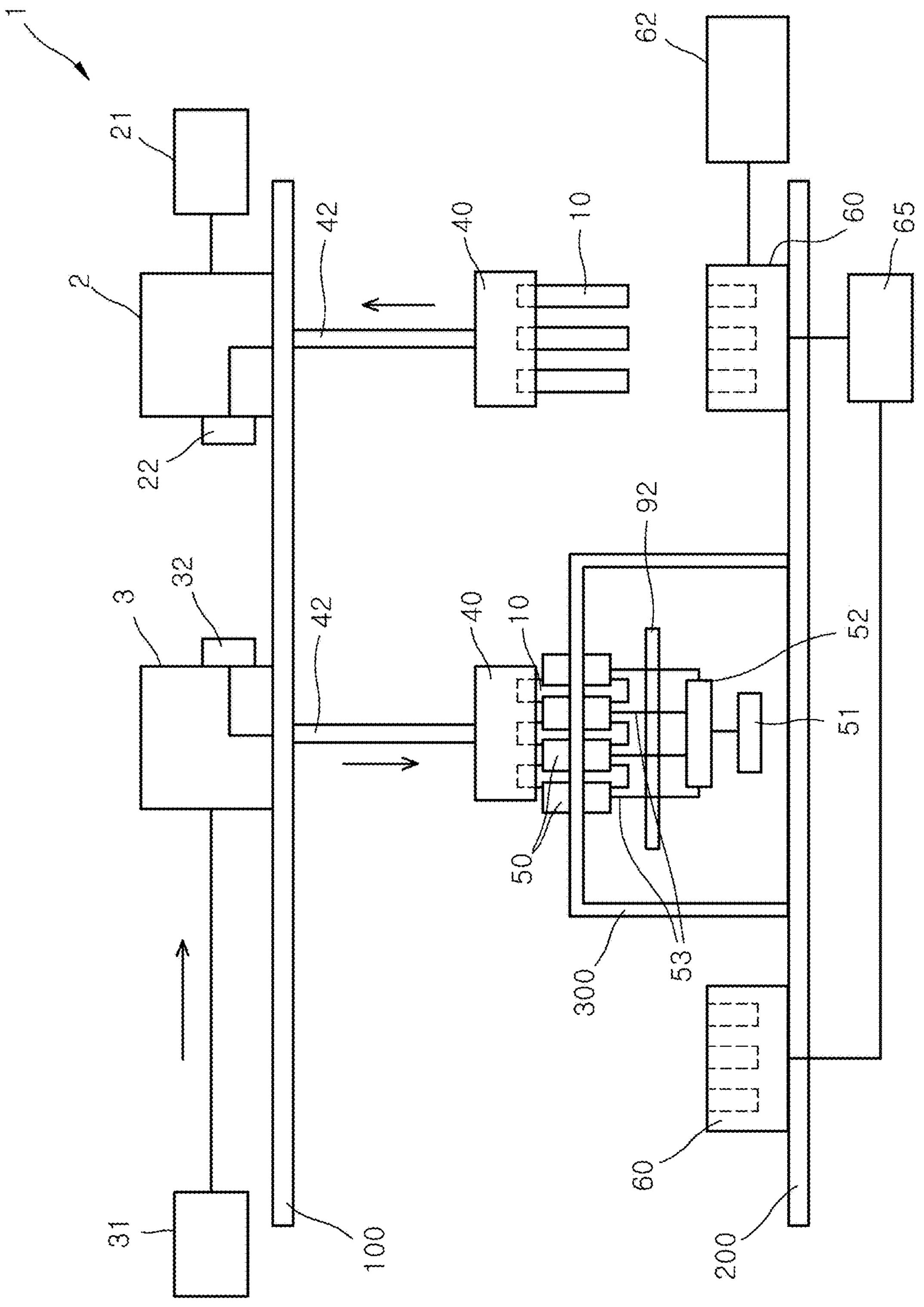

The second transfer unit (3) is moved over the battery support device (300) along the first rail (100) by the driving of the 2-1 drive unit (31), as shown in FIG. 13, and the shaft (42) is extended downward by the driving of the 2-2 drive unit (32) so that the gripping unit (40) of the second transfer unit (3) is aligned with the plurality of cylindrical batteries (10) in the state shown in FIG. 2(*a*).

Next, the gripping elements (40*a*, 40*b*) are moved closer to each other by the driving of the gripping drive unit (23) to grip the cylindrical batteries (10), as shown in FIG. 2(*b*).

Figure 14:
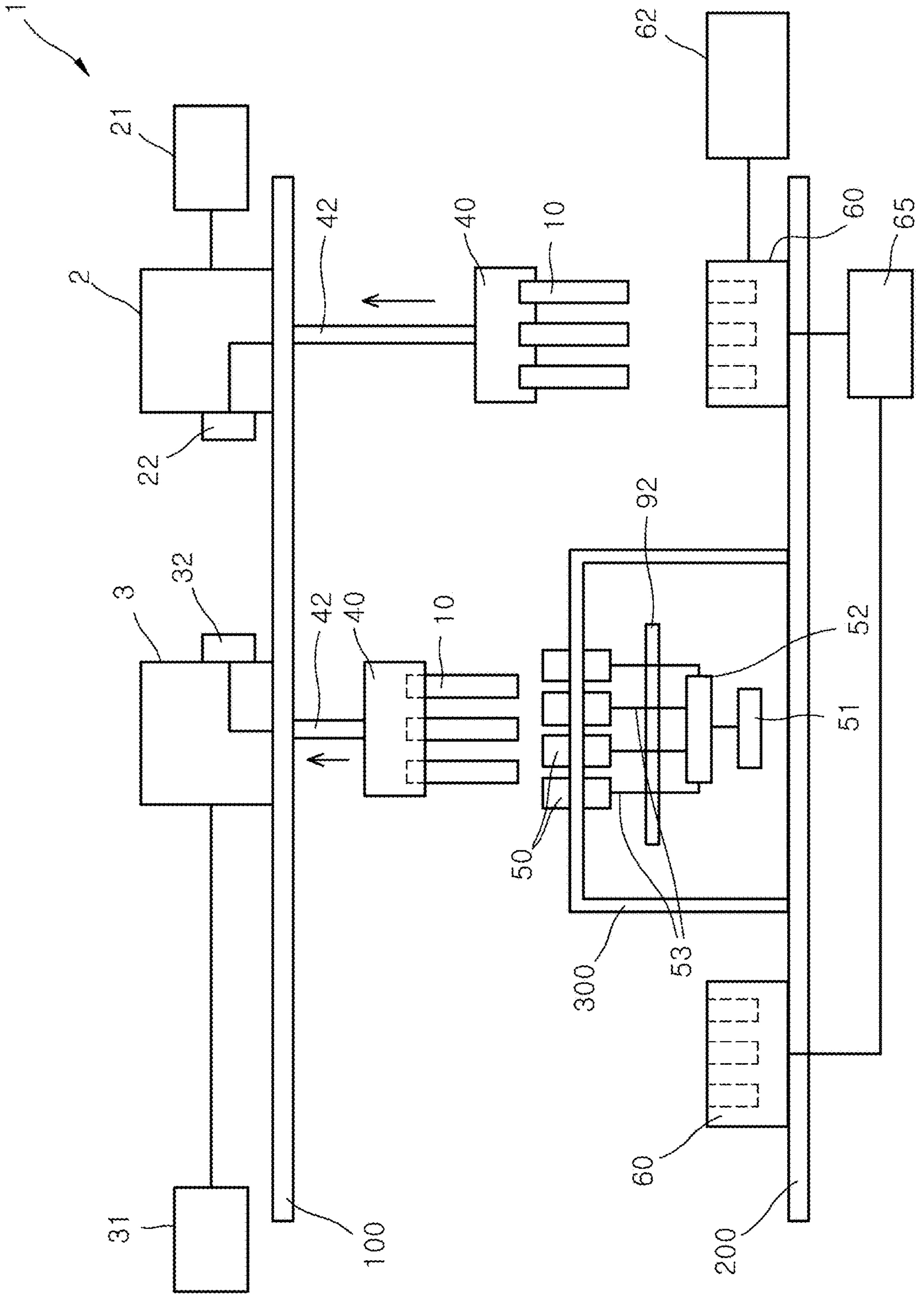

With the plurality of cylindrical batteries (10) gripped, the shaft (42) is retracted upward by the driving of the 2-2 drive unit (32) to move the cylindrical batteries (10) upward, as shown in FIG. 14.

Figure 15:
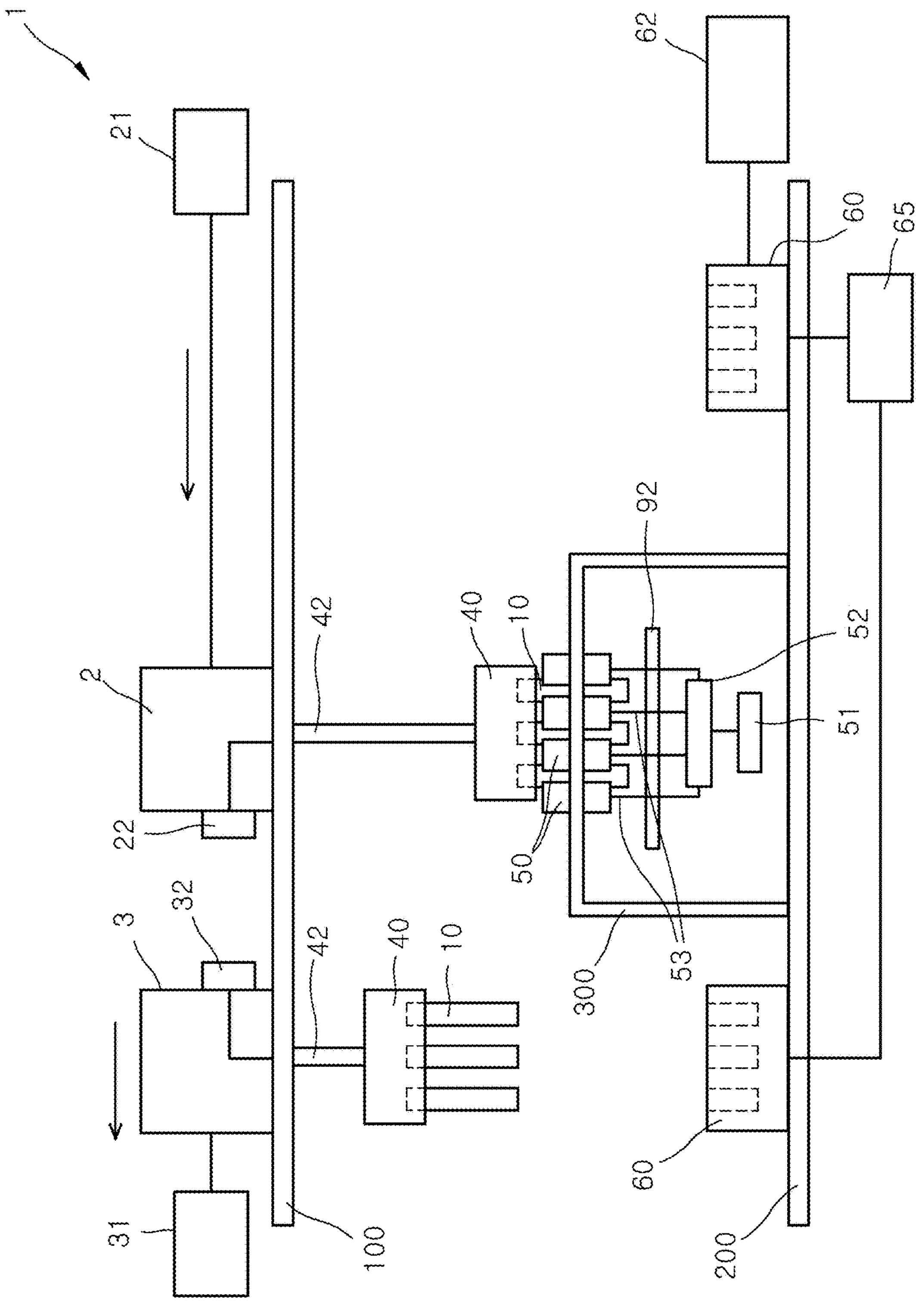

Then, both the first transfer unit (2) and the second transfer unit (3) are moved to the left along the first rail (100), as shown in FIG. 15. The first transfer unit (2) is moved so that the gripped cylindrical batteries (10) are placed between the rotating support rod (50) and the opposing support rod (70), and the second transfer unit (3) is moved to be aligned above the empty receiving container (60) disposed at the discharge waiting location.

Figure 16:
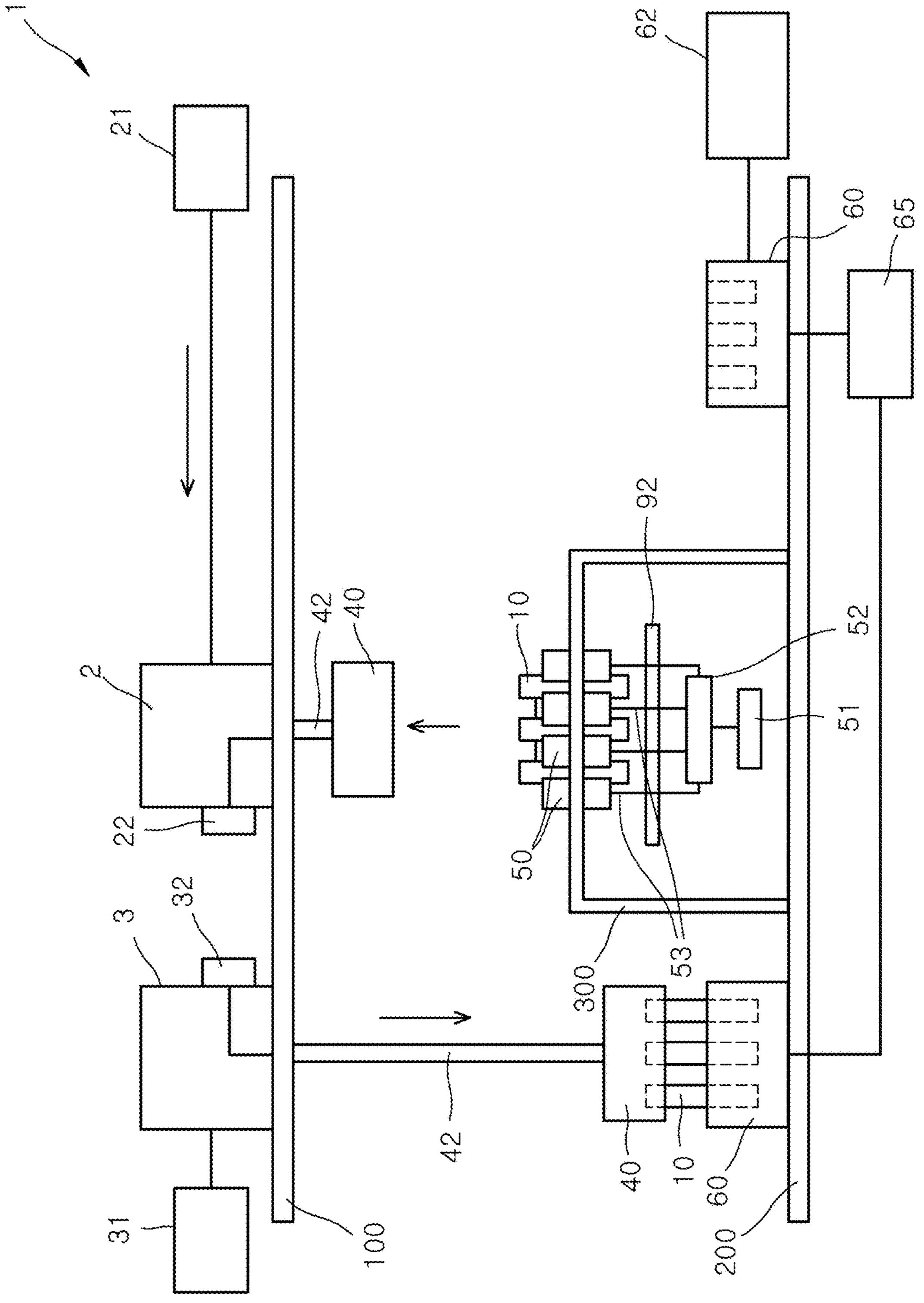

As shown in FIG. 16, the 2-2 drive unit (32) drives the shaft (42) to extend downward so that the cylindrical batteries (10) gripped by the gripping unit (40) are placed in the receiving container (60).

The cylindrical batteries (10) spaced apart are brought into contact with the rotating support rod (50) and the opposing support rod (70) by driving the movable support plates (92, 94). The gripping unit (40) of the first transfer unit (2) moves away from the cylindrical batteries (10) as shown in FIG. 2(*a*) to release the contact state, and then the shaft (42) retracts upward.

Figure 17:
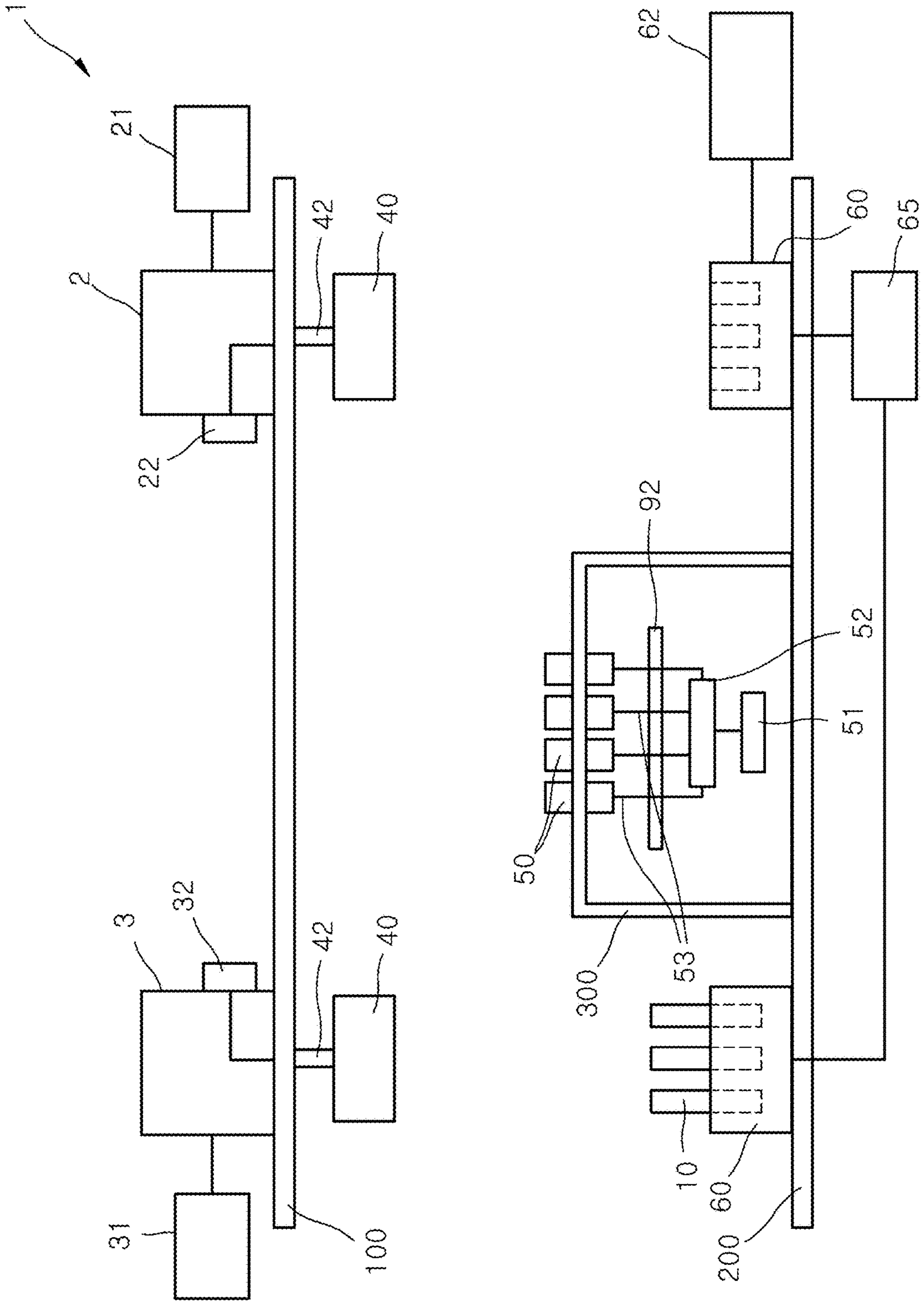

The shaft (42) of the second transfer unit (3) retracts upward, and the first transfer unit (2) returns to the position shown in FIG. 17.

The receiving container (60) containing the plurality of cylindrical batteries (10) on the left side of FIG. 17, that is, at the discharge waiting location, is discharged to the outside by the driving of the fourth drive unit (65), and then the above-described process is repeated, thereby continuously and quickly performing internal defect inspection in units of a plurality of cylindrical batteries.

Next, a method for detecting internal defects of a cylindrical battery based on a CT cross-sectional image generated from an X-ray image of the cylindrical battery will be described.

The hereinafter-described inspection method for internal defects of a cylindrical battery can use CT images generated from X-ray images captured by the defect inspection system described above, but it can also be applied to CT images of cylindrical batteries captured by systems with different configurations.

Figure 20:
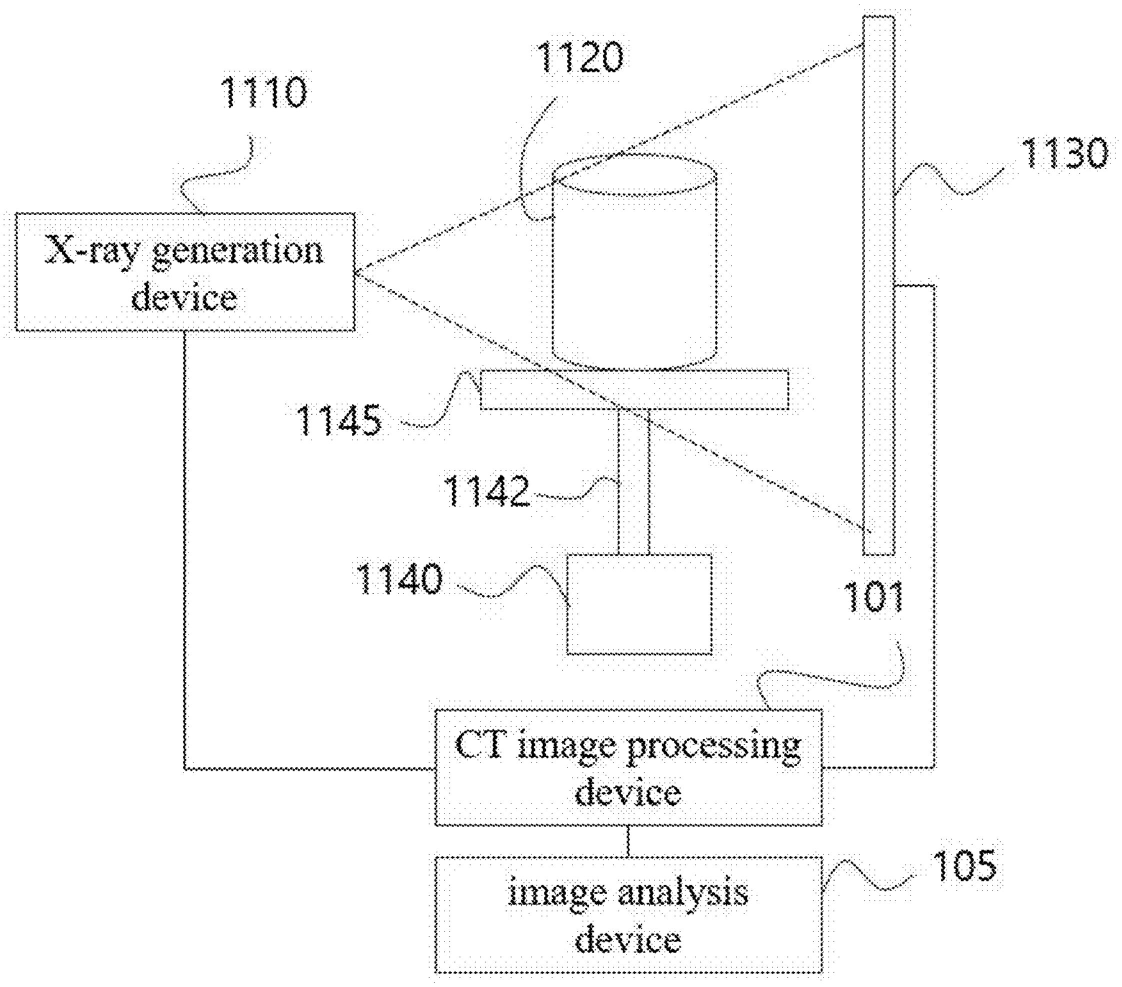
FIG. 20 is a conceptual diagram of an environment in which the present disclosure is implemented.

FIG. 20 shows an example of an environment where the internal defect determination method of a cylindrical secondary battery according to the present disclosure is carried out.

FIG. 20 shows the minimum environment where the internal defect determination method of a cylindrical secondary battery according to the present disclosure can be carried out. The environment includes an X-ray generation device (1110), a cylindrical secondary battery (1120), a rotating plate (1145) that supports and rotates the cylindrical secondary battery (1120), a drive device (1140) that rotates the rotating plate (1145), a rotating shaft (1142) of the rotating plate (1145), an X-ray detector (1130), a CT image processing device (101), and an image analysis device (105).

Although FIG. 20 shows that the cylindrical secondary battery (1120) rotates, the X-ray generation device (1110)

and the X-ray detector (1130) may rotate around the cylindrical secondary battery (1120) to capture and acquire X-ray images.

The CT image processing device (101) processes the data acquired by X-ray imaging using a CT image algorithm and reconstructs it into a 2D or 3D image.

The image analysis device (105) processes and analyzes the CT image reconstructed by the CT image processing device (101) according to the present disclosure to determine internal defects in the cylindrical secondary battery.

The CT image processing device (101) and the image analysis device (105) may be separate components, but they may also be configured as an integrated single device.

Figure 21:
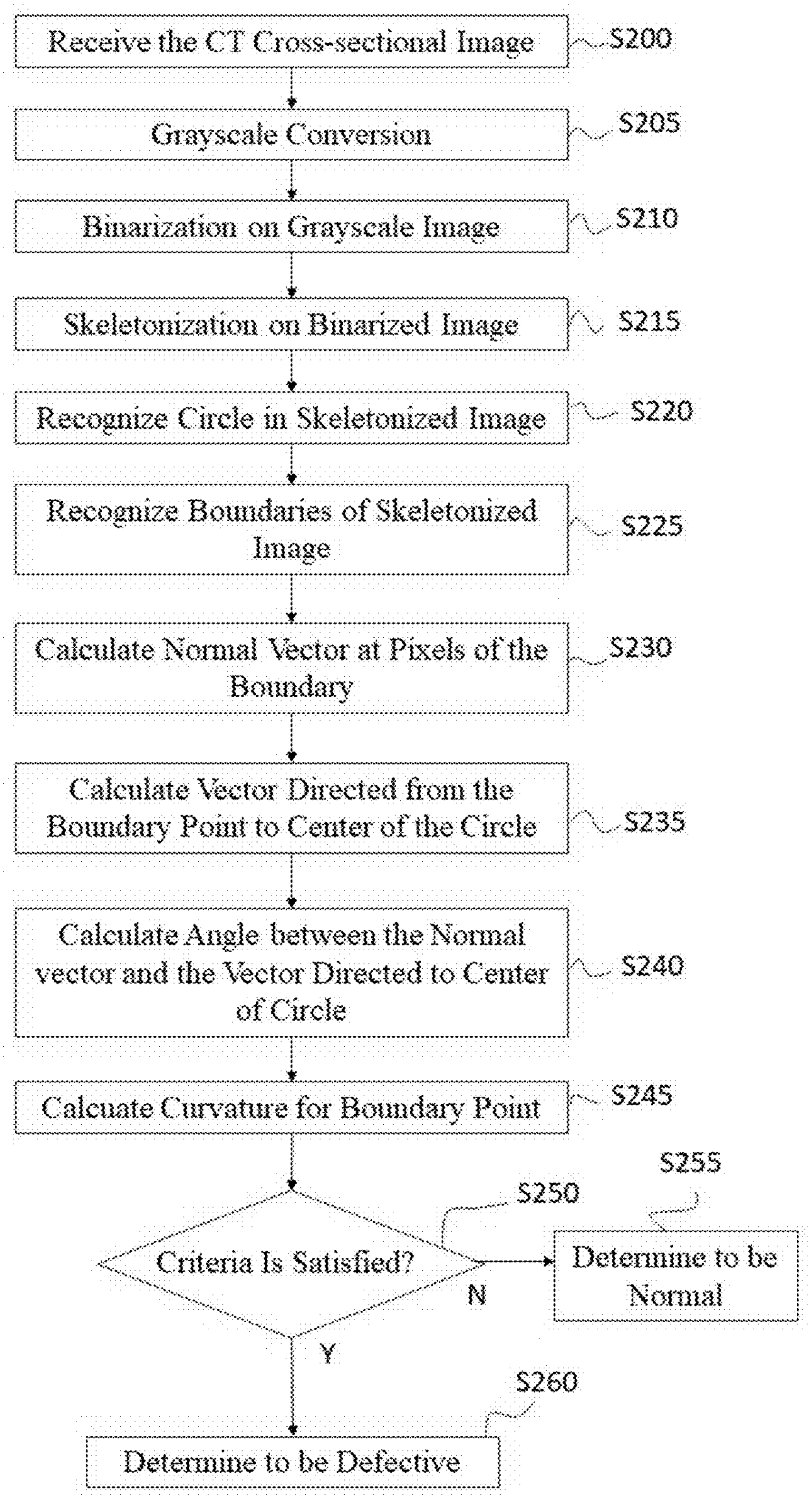
FIG. 21 is a flowchart of a method for detecting internal defects according to the present disclosure.

FIG. 21 shows a flowchart of the internal defect determination method of a secondary battery.

An X-ray image is acquired by the X-ray detector (1130) when X-rays emitted from the X-ray imaging device (1110) pass through the cylindrical secondary battery (1120). The drive device (1140) rotates the rotary plate (1145) at a predetermined angular interval while capturing X-ray images, thereby acquiring X-ray images at the predetermined angular interval. The plurality of X-ray images acquired in this way are input to the CT image processing device (101) to be reconstructed into a 3D C T image, and a CT cross-sectional image can be acquired in an arbitrary direction.

Figure 22:
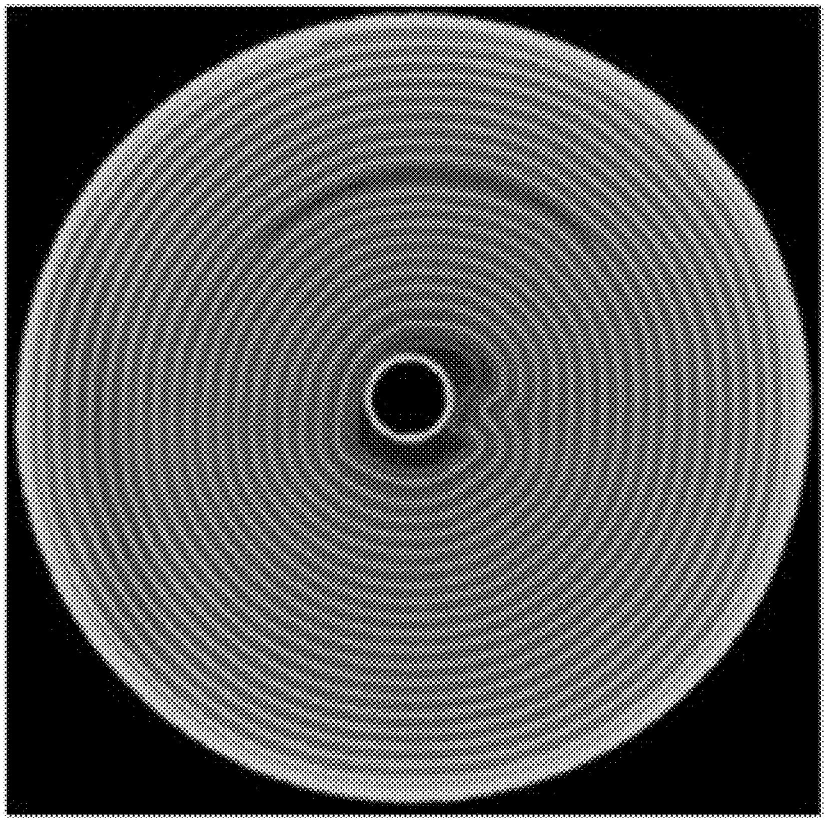
FIG. 22 is an example of a CT cross-sectional image of a secondary battery having internal defects, which is converted into a grayscale image.

The image analysis device (105) receives the CT cross-sectional image (S200) and performs grayscale conversion on the received CT cross-sectional image (S205). If the CT image processing device (101) provides a grayscale image, step (S205) is unnecessary. An example of a grayscale image is shown in FIG. 22.

In step (S210), binarization is performed on the grayscale image, where pixels with a brightness above a certain level are expressed as white and those below the level are expressed as black.

Figure 23:
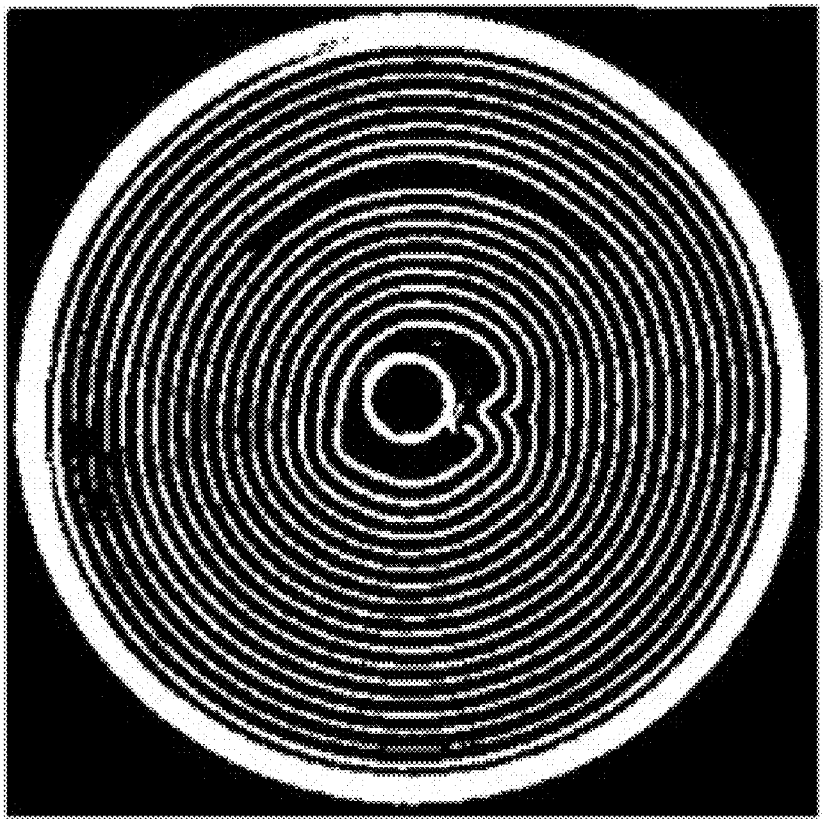
FIG. 23 is an image obtained by binarizing the image of FIG. 21.

By binarizing the grayscale image using an adaptive threshold, the inside of the battery can be distinguished. An example of an image obtained by performing binarization is shown in FIG. 23, where the battery structure is indicated by white pixels and the background is indicated by black pixels. According to another embodiment of the present disclosure, the battery structure may be indicated in black and the background in white by binarization.

In step (S215), skeletonization is performed on the binarized image. Skeletonization can be performed, for example, by the bwmorph function in the MATLAB program provided by The Math Works, Inc.

Figure 24:
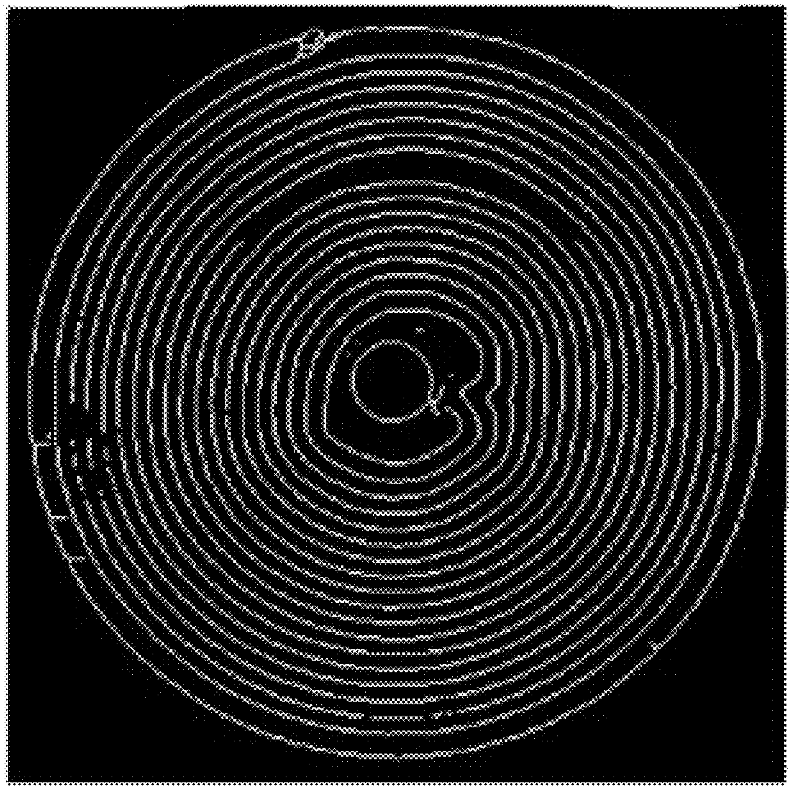
FIG. 24 is an image obtained by performing skeletonization on the image of FIG. 22.

Skeletonization reduces the objects in the image to essential structural elements, allowing for the generation of a thin image of the battery cross-section. An example of a skeletonized image obtained by performing skeletonization on the image of FIG. 23 is shown in FIG. 24.

Simplifying the image and thinning the lines through skeletonization can be advantageous in appropriately representing the boundaries for image analysis according to the present disclosure.

In step (S220), circles in the skeletonized image are recognized. Circle recognition can be performed using the imfindcircles function in MATLAB. The imfindcircles function recognizes circular patterns within a specified radius range and can calculate the center coordinates and radius.

If circles cannot be recognized by the imfindcircles function or another function that performs the same or similar function, the center coordinates of the skeletonized image are considered as the center coordinates of the circle (used in the process described later).

In step (S225), the boundaries of the skeletonized image are recognized. Boundary recognition can be performed, for example, by the bwboundaries function in MATLAB, which identifies pixels that form the boundary between black and white in the skeletonized image. The identified boundary indicates the battery plate.

Figure 25:
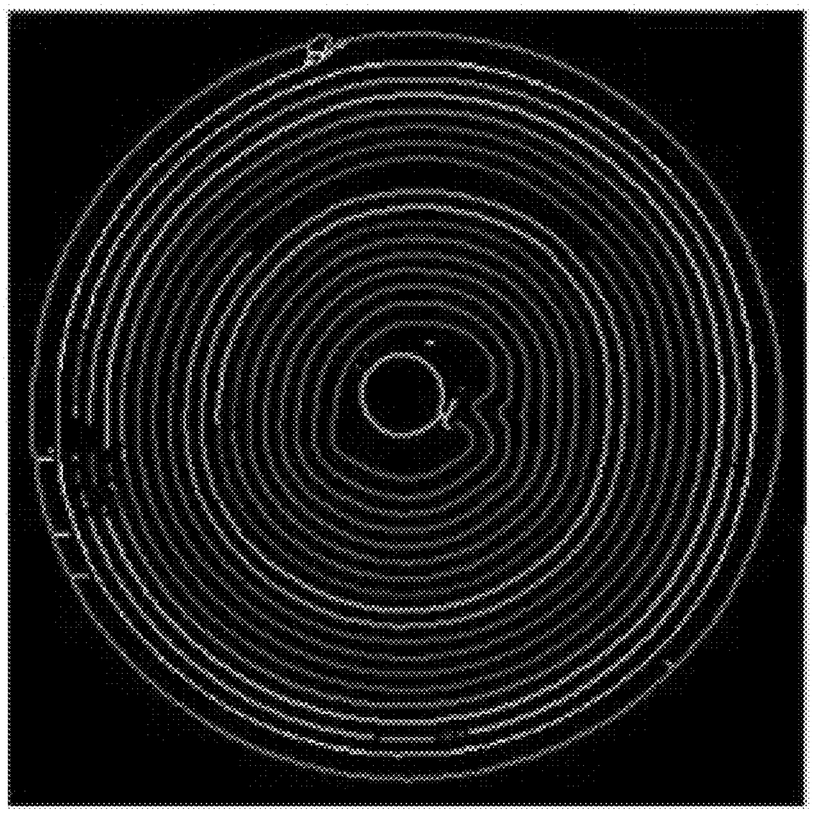
FIG. 25 is an image showing the result of performing boundary point recognition processing on the image of FIG. 23.

FIG. 25 shows an example of an image where the boundaries are recognized in the skeletonized image of FIG. 24.

If boundary recognition is performed on a non-skeletonized image, the recognized boundary may be displayed as separated polygons rather than a single line.

The 'no holes' option in the bwboundaries function can be used to remove noise within the circle that may cause errors in the analysis.

In step (S230), the normal vector at the pixels of the boundary recognized in step (S225), that is, at the boundary points, is calculated.

The normal vector can be calculated using the Frenet-Serret formula. The relationship between the normal vector (N) and the tangent vector (T) at a specific point, the curvature (K), and the distance between pixels(s) is as follows:

$$\frac{dT}{ds} = \kappa N \quad \text{[Mathematical Formula 1]}$$

Figure 26A:
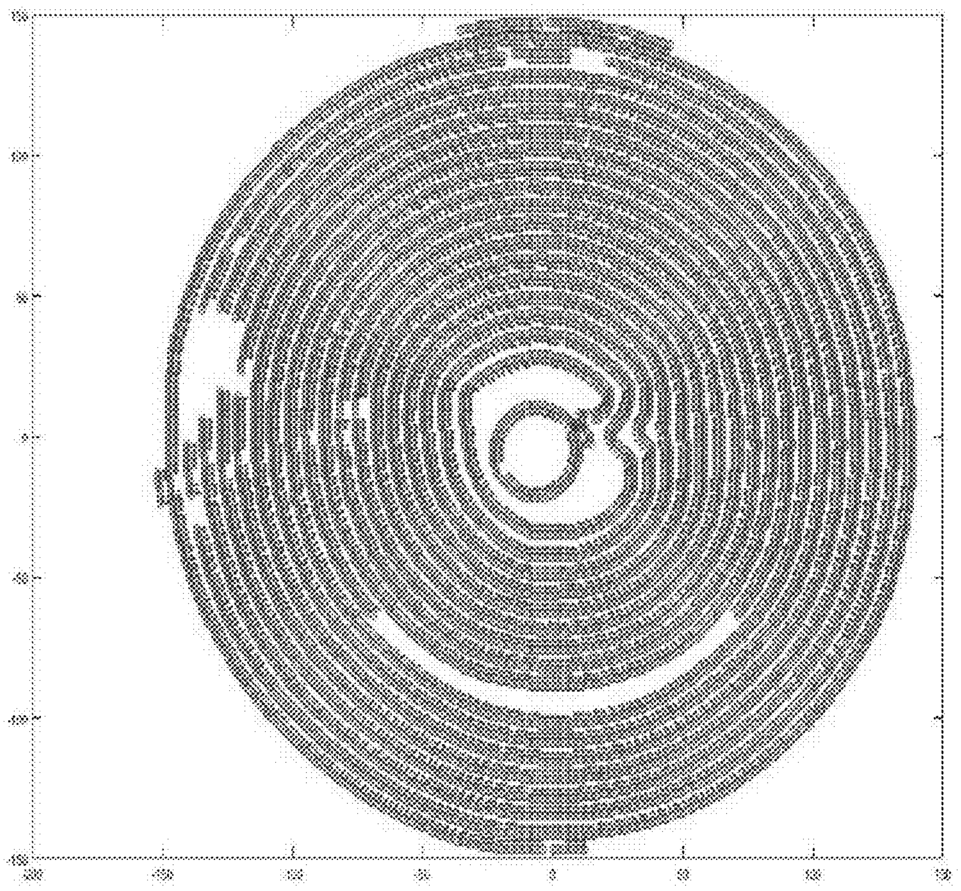
FIG. 26A is an image showing normal vectors at boundary points in the image of FIG. 24.
Figure 26B:
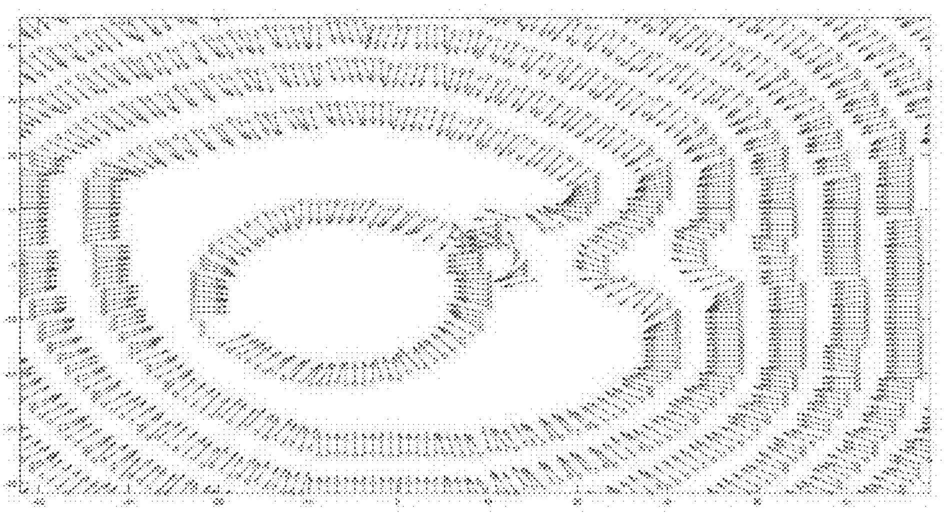
FIG. 26B is a partially enlarged view of the central portion of FIG. 26A.

The normal vector is a vector perpendicular to the tangent vector at each pixel (boundary point) forming the boundary. The normal vector is determined to be perpendicular to the tangent vector of each boundary point obtained using the finite difference method and simultaneously directed towards the center. FIG. 26A shows an example of an image with normal vectors displayed at each boundary point, and FIG. 26B shows a partially enlarged view of the central portion of FIG. 26A. Normal vectors can be calculated for all boundary points constituting the boundary, or only for boundary points selected according to a predetermined criterion.

In step (S235), a vector directed from the boundary point to the center of the circle is calculated. The center of the circle used for this vector calculation is the center of the circle recognized or considered in step (S220).

In step (S240), for each boundary point, the angle between the normal vector calculated in step (S230) and the vector calculated in step (S235) is calculated. If the calculated angle meets a predetermined criterion, for example, if it is greater than or equal to a predetermined value, the corresponding portion can be considered not to have a spiral shape, which can be determined to be due to an internal defect in the battery.

If the angle between the two vectors meets a predetermined criterion, a flag can be assigned to the corresponding boundary point for further analysis described later.

Next, the curvature is calculated for each boundary point (S245). The curvature (K) can be calculated based on the coordinates (x, y) of each boundary point using the following formula:

$$\kappa = \frac{|dx * d^2y - d^2x * dy|}{\left((dx)^2 + (dy)^2\right)^{3/2}} \quad \text{[Mathematical Formula 2]}$$

The first and second derivative values can be calculated by the finite difference method, as in calculating the normal vector. If the curvature calculated at each boundary point meets a predetermined criterion, for example, if it is greater than or equal to a predetermined value, it means that the shape of the boundary changes abruptly, and the corresponding portion is highly likely to be a potential internal defect.

Figure 27:
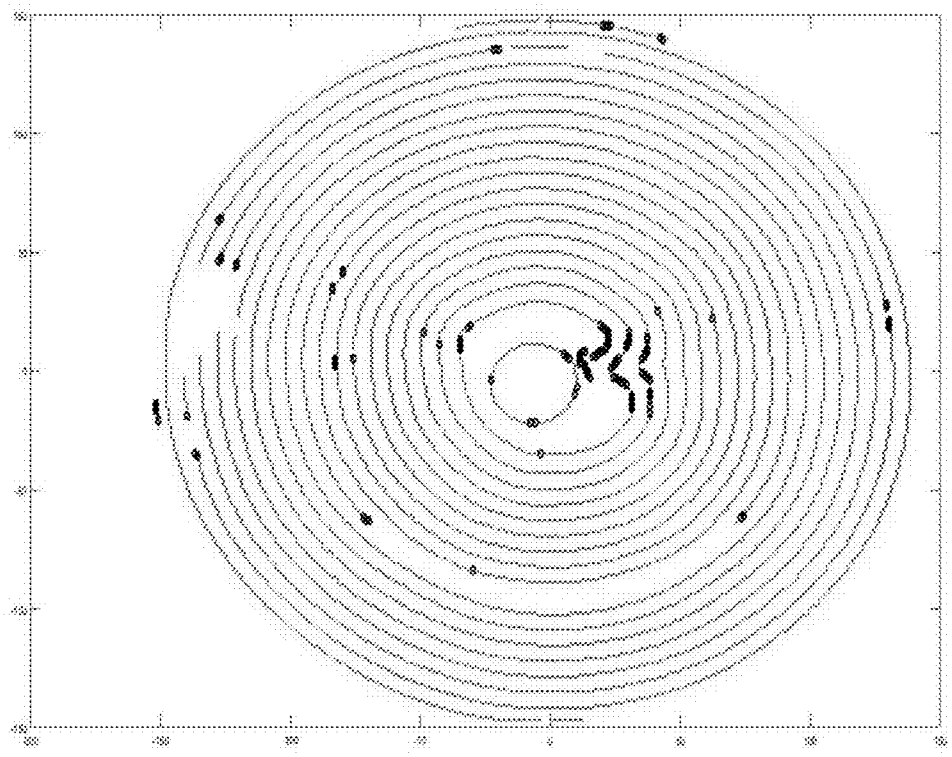
FIG. 27 is an image showing boundary points having a curvature greater than a predetermined value in the image of FIG. 24.

FIG. 27 shows an example of an image where boundary points with a curvature greater than a predetermined curvature value, which serves as a defect determination criterion, are displayed.

In step (S250), it is determined whether the values calculated in steps (S240) and (S245) satisfy the defect determination criteria.

The defect determination criterion according to the present disclosure is whether both of the following conditions are met for the corresponding boundary point: the angle calculated in step (S240) meets a predetermined criterion (for example, when it is greater than or equal to a predetermined value), and the curvature calculated in step (S245) meets a predetermined criterion (for example, when it is greater than or equal to a predetermined value).

Firstly, for the boundary points where the angle between the two vectors calculated in step (S240) meets the predetermined criterion for defect determination, the curvature at the corresponding boundary point is calculated secondly, and then it is determined whether the curvature meets the predetermined criterion for defect determination. Alternatively, the curvature criterion can be determined first, and then for the boundary points where the curvature criterion meets the predetermined criterion for defect determination, the defect determination criterion for the angle between the two vectors can be applied secondly. If both criteria meet the defect determination criteria, the corresponding portion can be determined as a defect.

By using both the angle criterion between the two vectors and the curvature criterion to detect internal defects in the secondary battery, it is possible to eliminate the possibility of false detection of an internal defect in cases where it actually meets one of the defect criteria but is normal. In particular, when skeletonizing a CT cross-sectional image, considerable noise may occur at the boundary. This method can significantly reduce cases where a normal portion is determined as a defect due to such noise.

Figure 28:
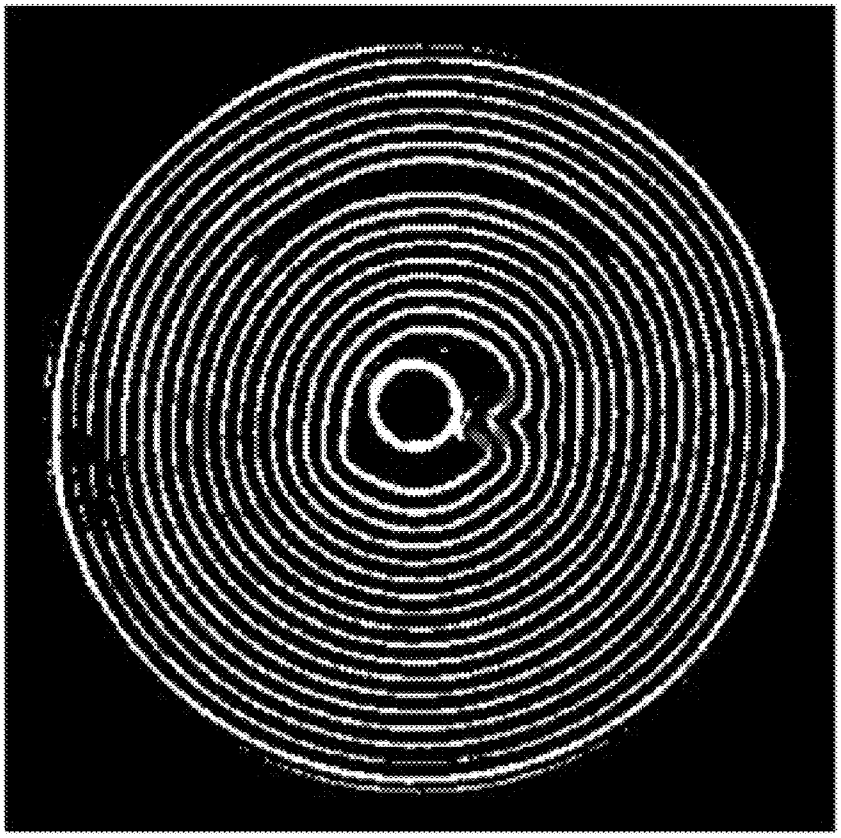
FIG. 28 is an example of an image marked at a point determined to be an internal defect.

In step (S260), the boundary points determined to be defective can be marked on the CT cross-sectional image. FIG. 28 shows an example of an image where the portions having defect are marked in red on the binarized image of FIG. 22.

According to the defect inspection system of the present disclosure, it is possible to acquire CT images of a plurality of cylindrical batteries at a time through X-ray imaging. By dividing such CT images and performing image processing, internal defects of the cylindrical batteries can be inspected very quickly. Also, since a system capable of continuously inspecting internal defects in units of a plurality of batteries is provided, there is an effect of increasing the inspection speed and reducing the inspection time.

According to the internal defect detection method of the present disclosure, there is an effect of being able to quickly and reliably detect internal deformation of a cylindrical secondary battery through image processing and analysis executed by an electronic computing device such as a computer.

Although the present disclosure has been described with reference to accompanying drawings, the scope of the present disclosure is determined by the claims described below and should not be interpreted as being restricted by the embodiments and/or drawings described above. It should be clearly understood that improvements, changes and modifications of the present disclosure disclosed in the claims and apparent to those skilled in the art also fall within the scope of the present disclosure. Accordingly, this description is to be taken only by way of example and not to otherwise limit the scope of the embodiments herein.

What is claimed is:

1. A battery defect inspection system comprising:

a support device for supporting a plurality of cylindrical batteries;

a first transfer unit configured to transfer the cylindrical batteries to the support device;

a second transfer unit configured to discharge the cylindrical batteries from the support device;

a first rail along which the first and second transfer units are guided;

a second rail extending parallel to the first rail, along which a receiving container accommodating the plurality of cylindrical batteries is guided and transferred;

an X-ray generating unit configured to irradiate X-rays toward the plurality of cylindrical batteries supported by the support device; and an X-ray detector disposed opposite the X-ray generating unit, wherein the support device includes a plurality of rotating support rods that rotate at predetermined angular intervals by a rotation driving unit, and a plurality of opposing support rods provided in a direction facing the rotating support rods; the X-ray generating unit and the X-ray detector are configured to capture X-ray images of the plurality of cylindrical batteries at the predetermined angular intervals; the first and second transfer units include grippers that are movable up and down and grip the cylindrical batteries; and the plurality of cylindrical batteries are supported between the rotating support rods and the opposing support rods such that the upper and lower sides of the cylindrical batteries are exposed.

2. The battery defect inspection system of claim 1, further comprising:

a first movable support plate that supports the plurality of rotating support rods and is movable toward and away from the cylindrical battery; and a second movable support plate that supports the plurality of opposing support rods and is movable toward and away from the cylindrical battery.

3. The battery defect inspection system of claim 2, wherein the first movable support plate and the second movable support plate are configured to move away from the cylindrical battery when the cylindrical battery is supplied or discharged; and move toward the cylindrical battery to bring the cylindrical battery into contact with the rotating support rods and the opposing support rods when performing X-ray imaging for defect inspection of the cylindrical battery.

4. The battery defect inspection system of claim 1, wherein a groove is formed in the circumferential direction of at least one of the rotating support rod and the opposing support rod; an elastomer is disposed in the groove; and a side surface of the cylindrical battery is configured to contact the elastomer.

5. The battery defect inspection system of claim 1, wherein the gripper comprises a gripping drive unit; and a pair of gripping elements that are configured to move toward and away from each other by the gripping drive unit.

6. The battery defect inspection system of claim 1, further comprising a housing, wherein the first transfer unit, the second transfer unit, the first rail, the second rail, the X-ray generating unit, and the X-ray detector are disposed inside the housing; and the housing includes a first shutter provided on the upstream side of the second rail and configured to be openable and closable, and a second shutter provided on the downstream side of the second rail and configured to be openable and closable.

7. The battery defect inspection system of claim 1, wherein the support device further comprises a driving force transmission unit for transmitting a driving force of the rotation driving unit to the rotating support rods, and an idler; the driving force transmission unit is a timing belt; the rotating support rods include a timing pulley associated with the timing belt; and the idler is provided to press the timing belt toward the rotation driving unit.

8. The battery defect inspection system of claim 1, wherein the support device further comprises an adjustment screw connected to the second movable support plate; and a bracket that supports the second movable support plate and is threadedly coupled to the adjustment screw, wherein the second movable support plate is configured to move toward and away from the cylindrical battery by rotation of the adjustment screw.

9. A method for performing X-ray imaging on a plurality of cylindrical batteries using the battery defect inspection system of claim 1, the method comprising, a first step of lowering a gripper of the first transfer unit toward a receiving container accommodating the plurality of cylindrical batteries, gripping the plurality of cylindrical batteries with a pair of gripping elements, and raising the gripper;

a second step of moving the first transfer unit along the first rail so that the plurality of cylindrical batteries gripped by the first transfer unit are disposed between a plurality of rotating support rods and a plurality of opposing support rods;

a third step of moving the first support plate and the second support plate toward each other to bring the plurality of cylindrical batteries into contact with the plurality of rotating support rods and the plurality of opposing support rods;

a fourth step of performing X-ray imaging on the plurality of cylindrical batteries while a rotation driving unit rotates the plurality of rotating support rods at predetermined angular intervals;

a fifth step of transferring the receiving container to a discharge waiting position along the second rail;

a sixth step of moving the first support plate and the second support plate away from each other;

a seventh step of moving a second transfer unit toward the plurality of cylindrical batteries, gripping the plurality of cylindrical batteries with a gripper of the second transfer unit, and moving the second transfer unit toward a receiving container disposed at the discharge waiting position;

an eighth step of lowering the gripper of the second transfer unit, placing the plurality of cylindrical batteries into the receiving container disposed at the discharge waiting position, and raising the gripper; and a ninth step of supplying a new receiving container accommodating the plurality of cylindrical batteries to a supply position.

* * * * *